United States Patent [19]

Kikuchi

[11] Patent Number: 4,909,613
[45] Date of Patent: Mar. 20, 1990

[54] ZOOM LENS

[75] Inventor: Shuichi Kikuchi, Yokohama, Japan

[73] Assignee: Ricoh Company, Ltd., Tokyo, Japan

[21] Appl. No.: 347,221

[22] Filed: May 2, 1989

[30] Foreign Application Priority Data

May 2, 1988 [JP] Japan .................. 63-109607
Jul. 18, 1988 [JP] Japan .................. 63-178483

[51] Int. Cl.⁴ .................. G02B 15/14; G02B 9/64
[52] U.S. Cl. .................. 350/423; 350/426
[58] Field of Search .................. 350/423, 426

[56] References Cited

U.S. PATENT DOCUMENTS 4,720,179 1/1988 Ito .................. 350/426

Primary Examiner—Bruce Y. Arnold
Assistant Examiner—Rebecca D. Gass
Attorney, Agent, or Firm—Oblon, Spivak, McClelland, Maier & Neustadt

[57] ABSTRACT

A zoom lens comprises a front lens group having a positive focal length and a rear lens group having a negative focal length, with the distance between the front and rear lens groups being variable for varying the magnification of the zoom lens. The front lens group comprises a first front lens group having a negative focal length and a second front lens group having a positive focal length, the first and second front lens groups being successively arranged in the order specified from an object side. The first front lens group comprises, in the order named from the object side, at least a positive lens and a negative lens. The second front lens group comprises at least one negative lens and at least two positive lenses. The rear lens group comprises, in the order specified from the object side, a positive lens, a negative lens, a negative lens, and a positive lens. The distance between the first and second front lens groups varies during zooming movement of the zoom lens.

2 Claims, 41 Drawing Sheets

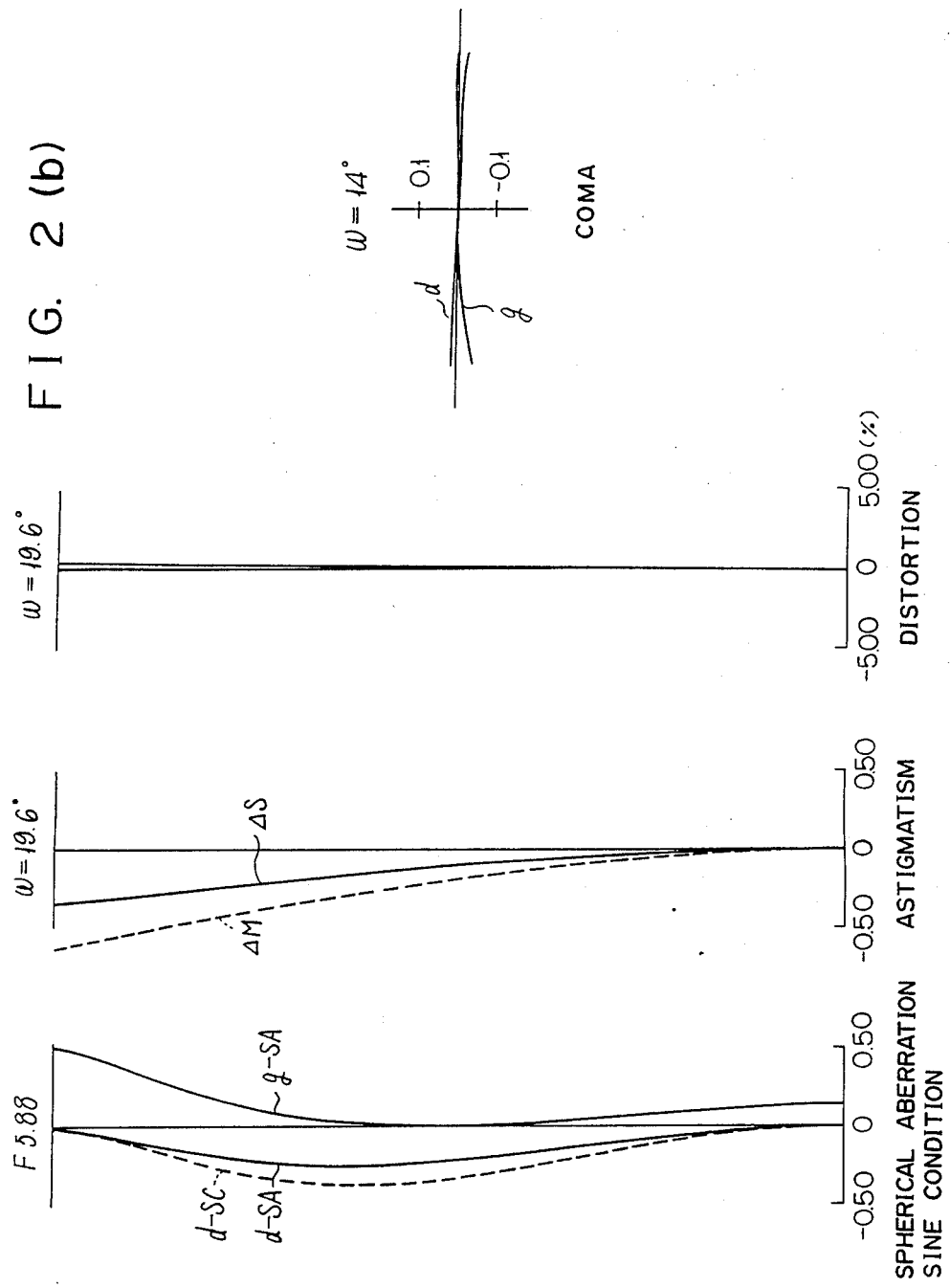

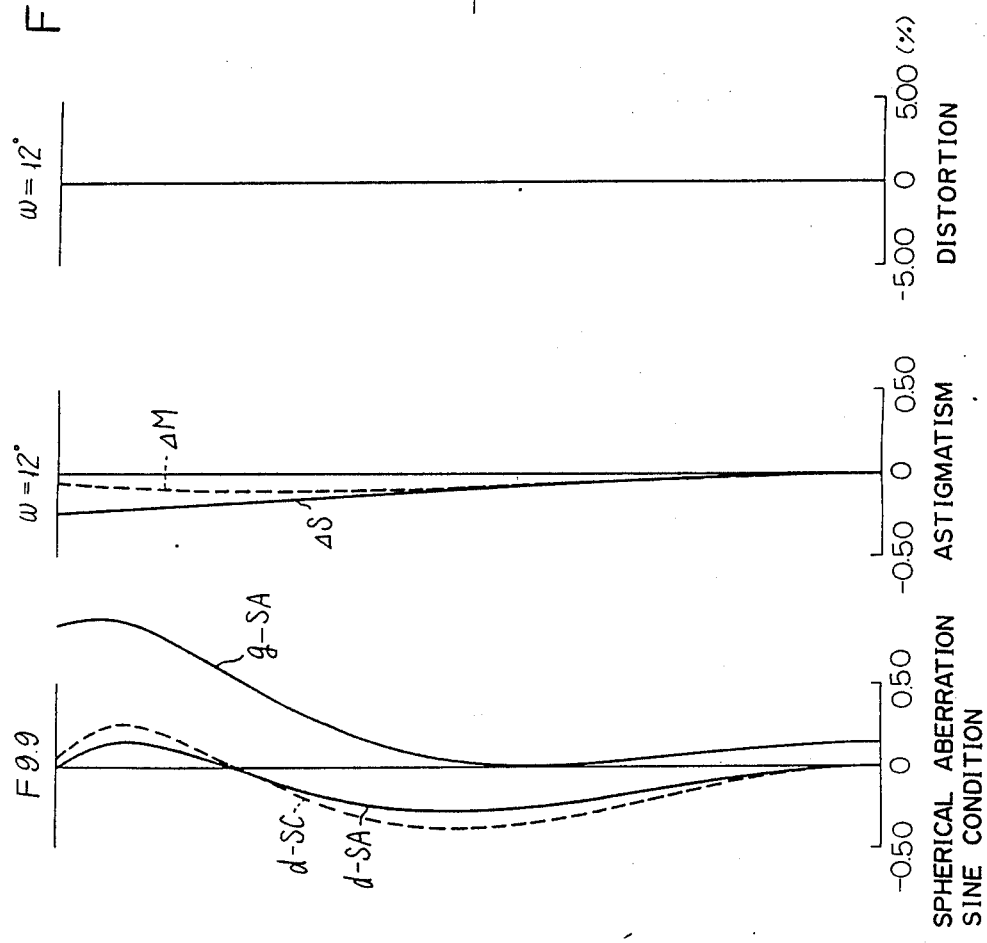

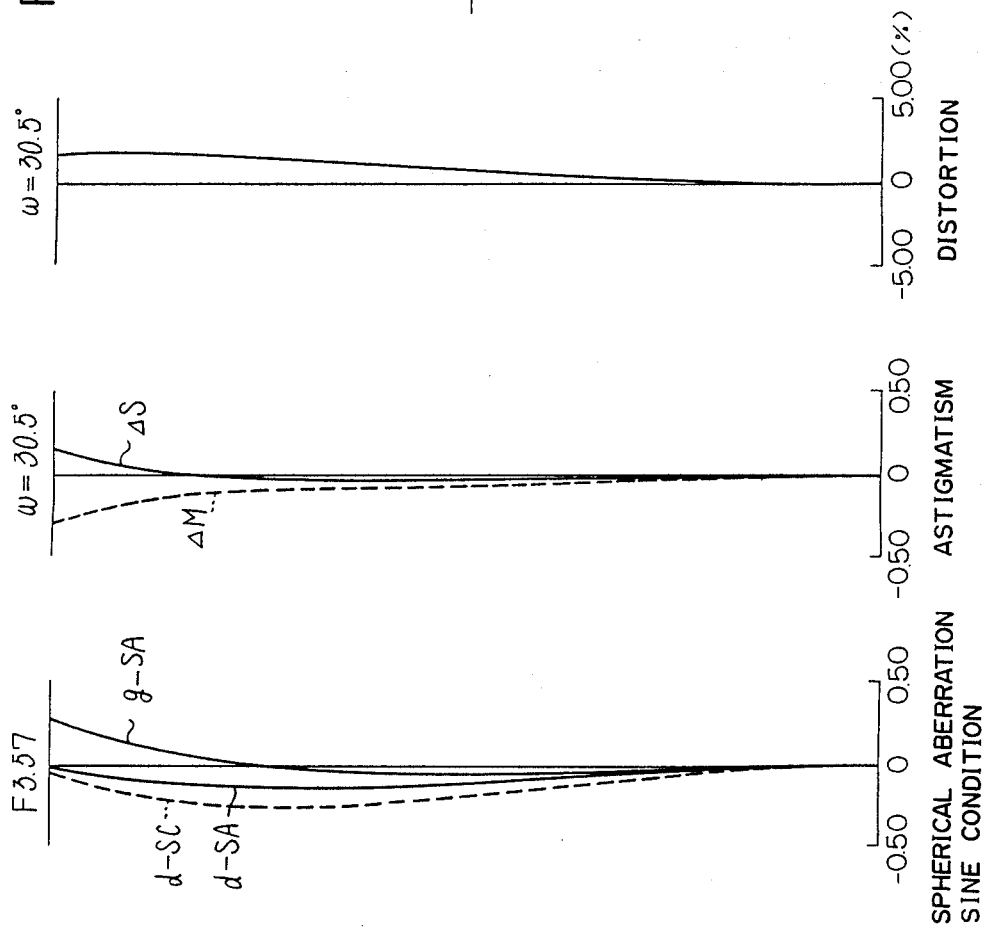

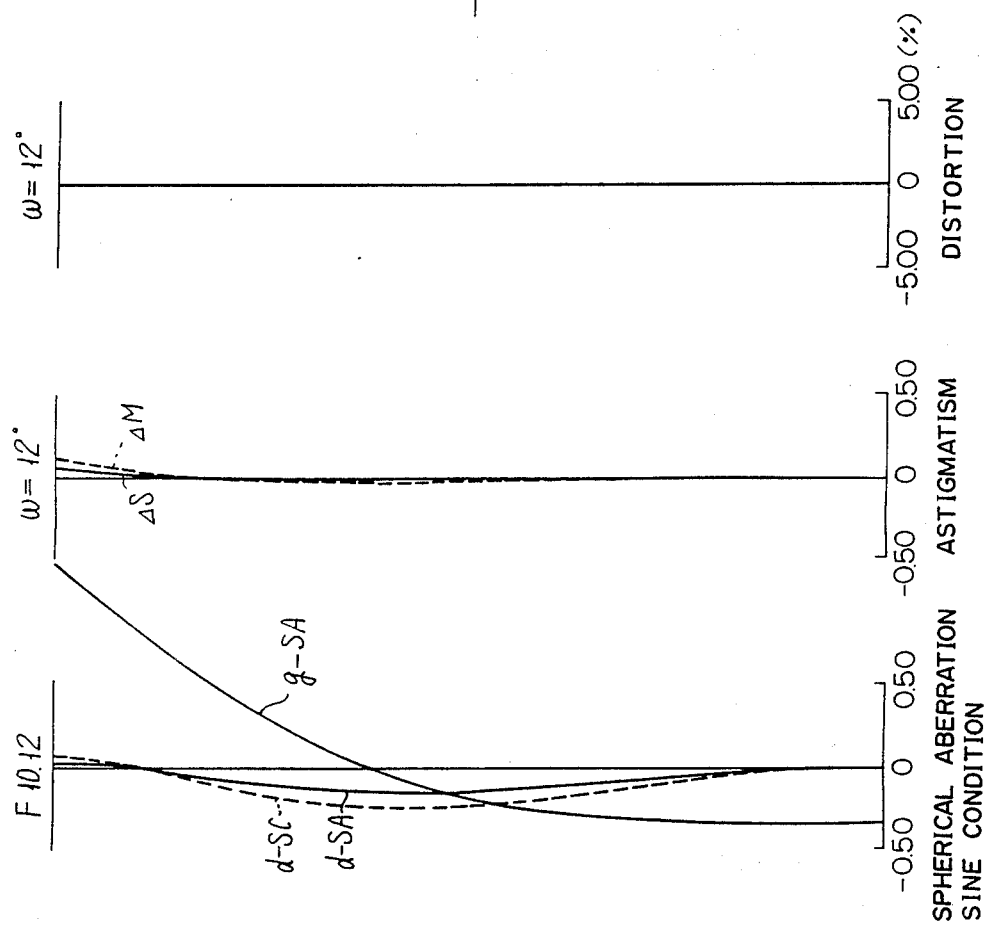

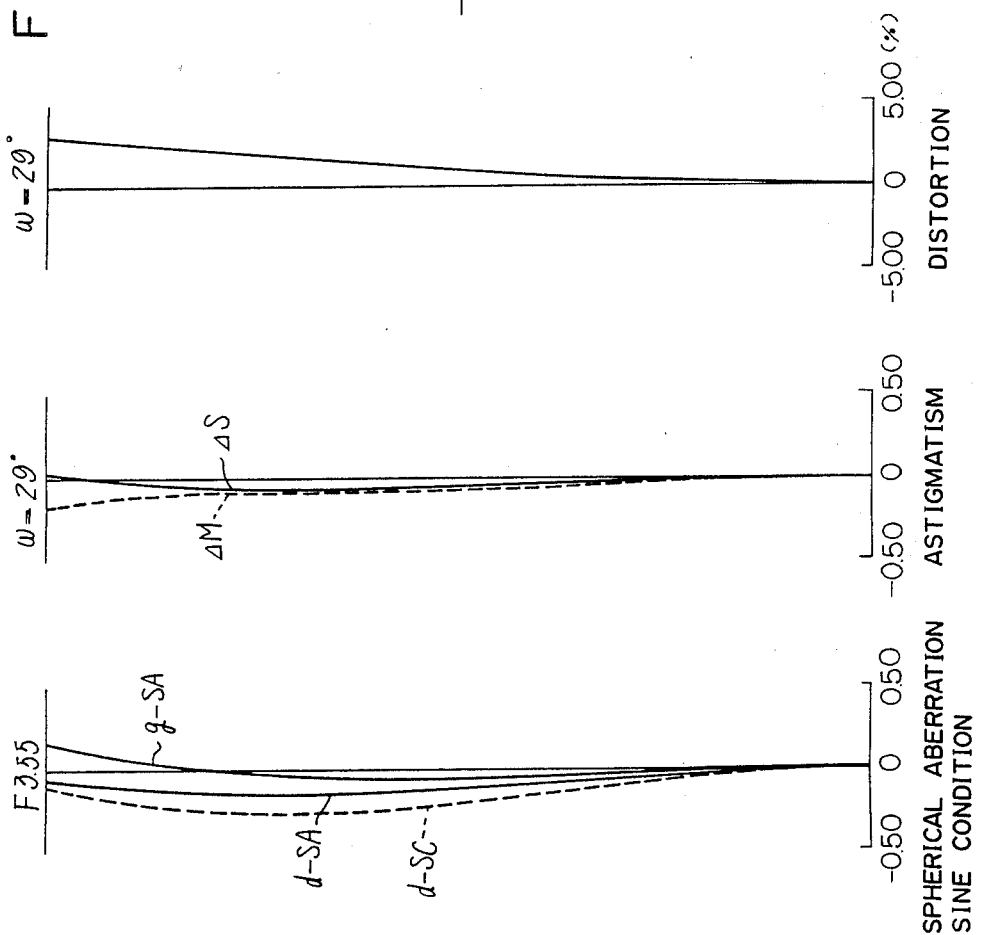

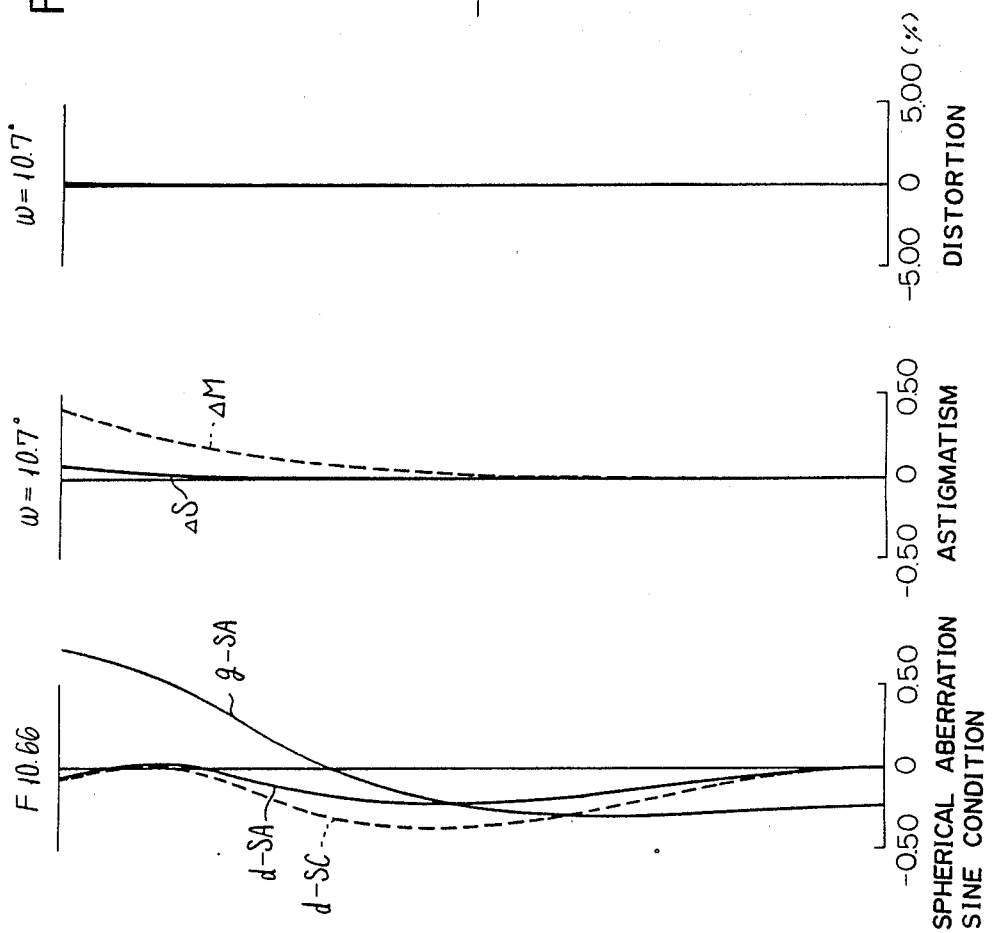

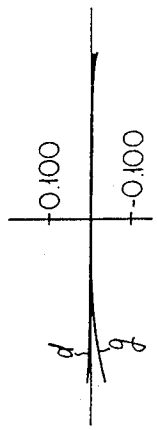

F I G. 11(c)
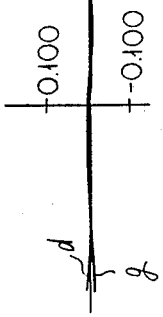
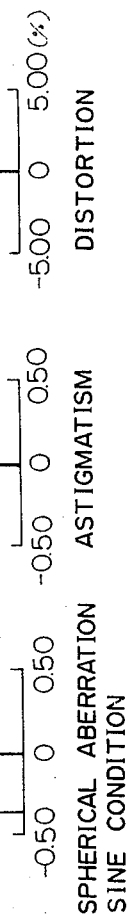

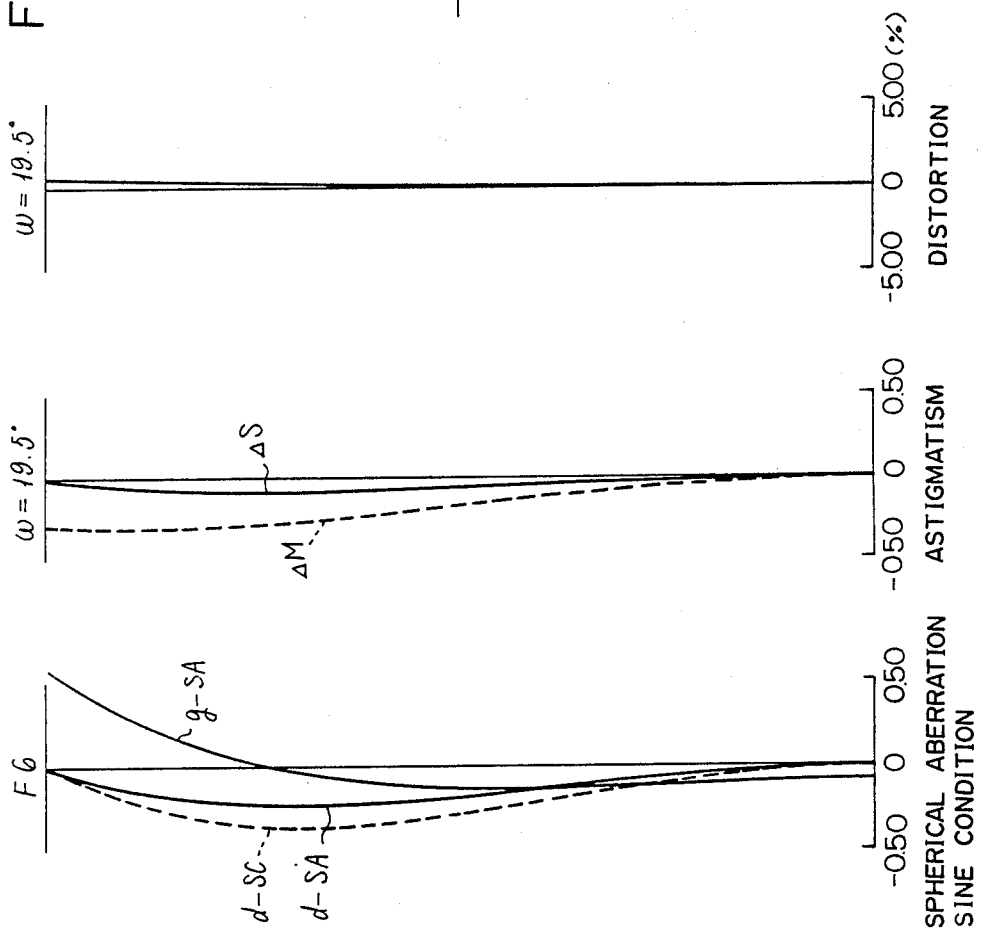

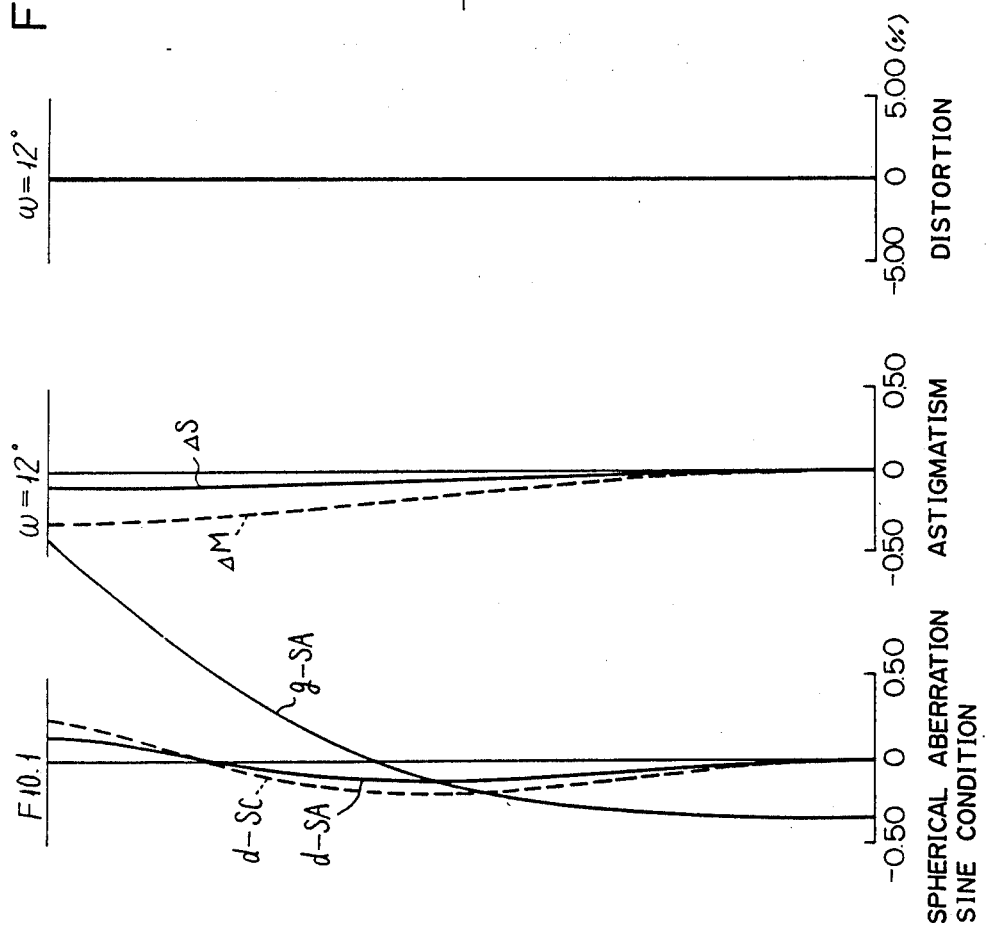

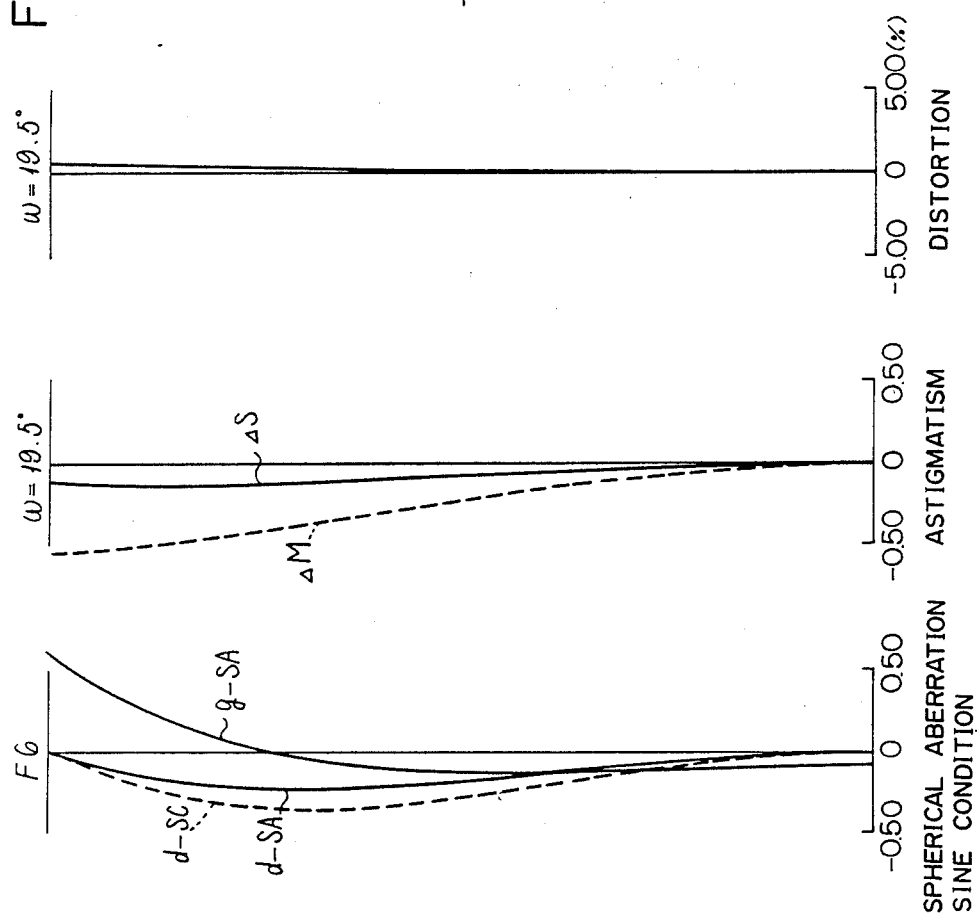

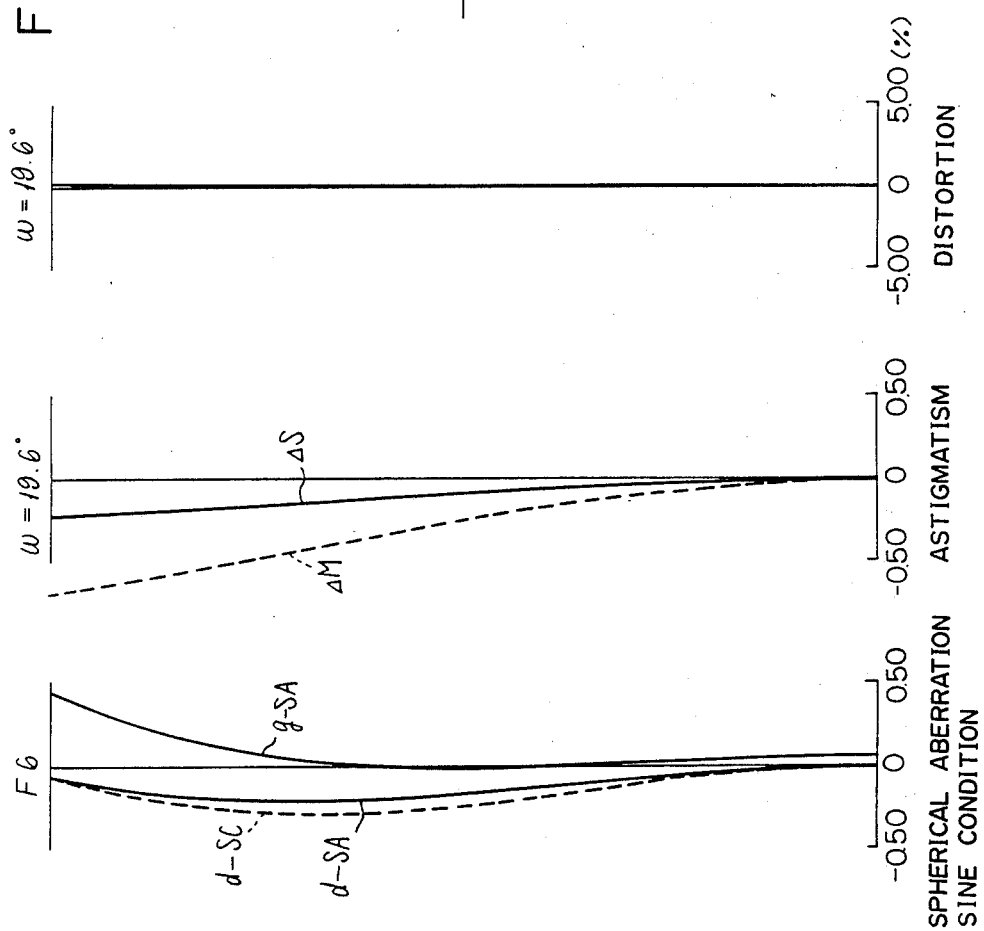

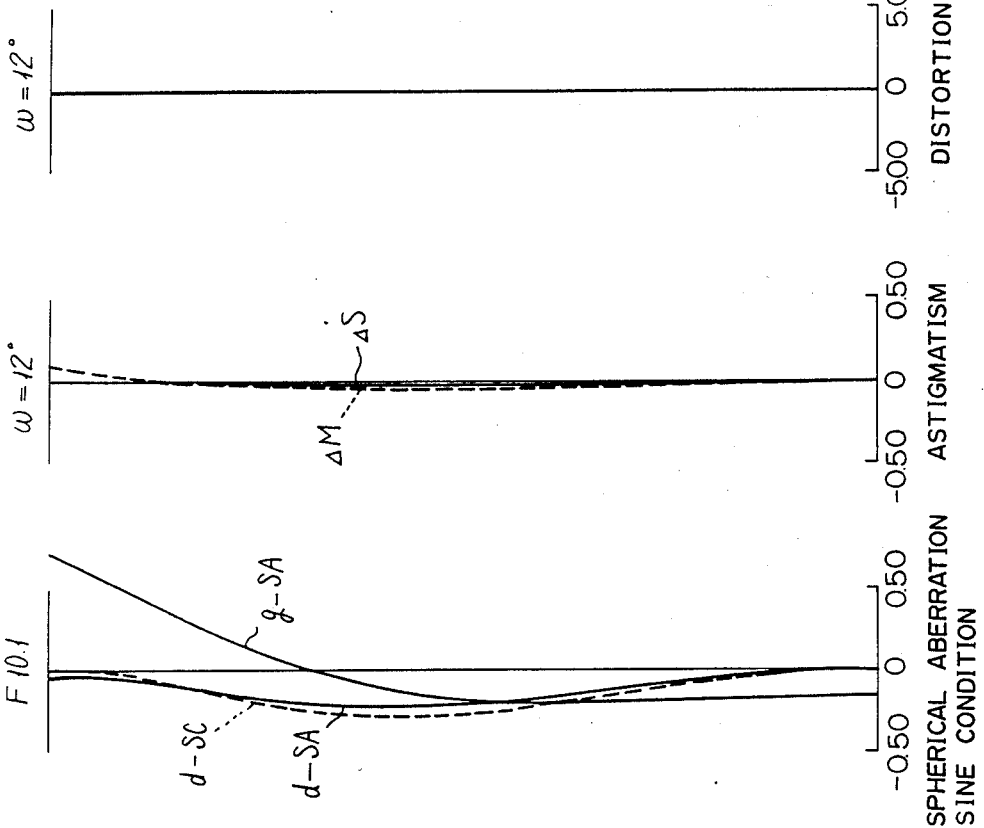

ZOOM LENS

BACKGROUND OF THE INVENTION

The present invention relates to a zoom lens.

There is known a zoom lens comprising a front lens group having a positive focal length and a rear lens group having a negative focal length, the distance between the front and rear lens groups being variable for varying its magnification ratio. This zoom lens is advantageous in that since it has only two movable lens groups, the mechanism for moving the lens groups is simple, and the entire length of the zoom lens can be reduced because the magnification of the rear lens group is 1 at all times. Therefore, various zoom lenses of this type have heretofore been proposed. Most of the proposed zoom lenses have a magnification ratio of 2 or less which is the ratio between the focal length of the zoom lens at the telephoto end of the zooming movement and the focal length thereof at the wide angle end of the zoom lens stroke, and only few zoom lenses having a magnification ratio exceeding 2 are known. One of such few zoom lenses, which is disclosed in Japanese Laid-Open Patent Publication No. 62-264019, has achieved a magnification However, the performance of the disclosed zoom lens has proven unsatisfactory because the chromatic aberration thereof caused by its magnification is not sufficiently corrected. More specifically, since the chromatic aberration of the rear lens group caused by the magnification is not sufficiently corrected, as the rear lens group is moved, the chromatic aberration of the entire zoom lens system caused by the magnification of the image plane varies. This tendency is greater as the magnification ratio becomes larger.

SUMMARY OF THE INVENTION

It is therefore an object of the present invention to provide a two-lens-group zoom lens which has a wide angle of view with the half angle of view being about 30° and a magnification ratio of nearly 3, which is compact and of good performance.

According to the present invention, there is provided a zoom lens which comprises a front lens group having a positive focal length and a rear lens group having a negative focal length, with the distance between the front and rear lens groups being variable for varying the magnification of the zoom lens. The front lens group comprises a first front lens group having a negative focal length and a second front lens group having a positive focal length, the first and second front lens groups being successively arranged in the order specified from an object side. The first front lens group comprises, in the order named from the object side, at least a positive lens and a negative lens. The second front lens group comprises at least one negative lenses and at least two positive lenses. The rear lens group comprises, in the order specified from the object side, a positive lens, a negative lens, a negative lens, and a positive lens. Assuming that the front lens group has a focal length $f_1$, the rear lens group has a focal length $f_2$, the entire zoom lens has a focal length $f_W$ at the wide angle end of the zoom lens stroke and a focal length $f_T$ at the telephoto end of the zoom lens stroke, the average of Abbe numbers of the positive lens in the first front lens group is indicated by $\nu_{1ap}$, the average of Abbe numbers of the negative lens in the first front lens group by $\nu_{1an}$, the average of Abbe numbers of the positive lenses in the second front lens group by $\nu_{1bp}$, the average of Abbe numbers of the negative lens in the second front lens group by $\nu_{1bn}$, the Abbe number of the third lens in the rear lens group by $\nu_{23}$, and the Abbe number of the fourth lens in the rear lens group by $\nu_{24}$, these parameters meeting the following conditions:

$$0.6 < f_1/f_W < 0.9 \qquad (i)$$

$$0.15 < |f_2|/f_T < 0.3 \qquad (ii)$$

$$\nu_{1ap} < \nu_{1an} \qquad (iii)$$

$$\nu_{1bp} > \nu_{1bn} \qquad (iv)$$

$$\nu_{23} > \nu_{24} \qquad (v)$$

The distance between the first and second front lens groups varies during zooming movement of the zoom lens.

The above and other objects, features and advantages of the present invention will become more apparent from the following description when taken in conjunction with the accompanying drawings in which preferred embodiments of the present invention are shown by way of illustrative example.

BRIEF DESCRIPTION OF THE DRAWINGS

FIGS. 4(a) through 4(c) are diagrams showing aberrations of the zoom lens of EXAMPLE 2;

FIGS. 6(a) through 6(c) are diagrams showing aberrations of the zoom lens of EXAMPLE 3;

FIGS. 11(a) through 11(e) are diagrams showing aberrations of the zoom lens of EXAMPLE 5 and comparative EXAMPLE:

FIGS. 13(a) through 13(e) are diagrams showing aberrations of the zoom lens of EXAMPLE 6 and comparative EXAMPLE;

FIGS. 17(a) through 17(e) are diagrams showing aberrations of the zoom lens of EXAMPLE 7 and comparative EXAMPLE.

DETAILED DESCRIPTION

According to the present invention, two types of zoom lenses are provided. Each of the zoom lenses comprises a front lens group having a positive focal length and a rear lens group having a negative focal length, the distance between the front and rear lens groups being variable for varying the magnification of the zoom lens.

Figure 1:
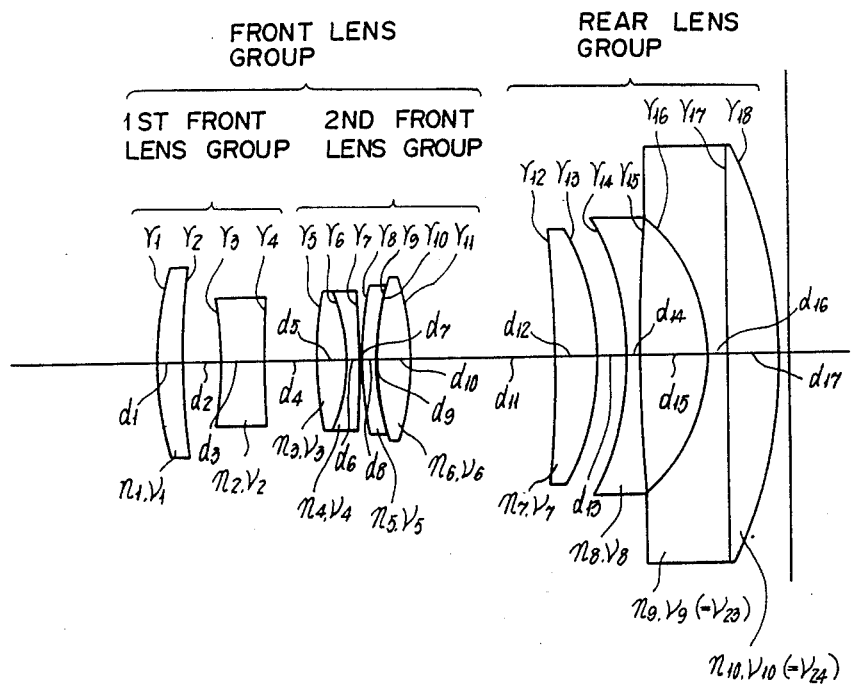
FIG. 1 is a schematic view of a zoom lens according to EXAMPLE 1.

As shown in FIG. 1, which illustrates a zoom lens according to EXAMPLE 1 of the present invention, the front lens group of the zoom lens comprises a first front lens group having a negative focal length and a second front lens group having a positive focal length, the first and second front lens groups being successively arranged in the order specified from an object side. The first front lens group comprises, in the order named from the object side, at least a positive lens and a negative lens, whereas the second front lens group comprises at least one negative lens and at least two positive lenses.

The rear lens group comprises, in the order specified from the object side, a positive lens, a negative lens, a negative lens, and a positive lens.

It is assumed that the front lens group has a focal length $f_1$, the rear lens group has a focal length $f_2$, the entire zoom lens has a focal length $f_W$ at the wide angle end of the zoom lens stroke and a focal length $f_T$ at the telephoto end of the zoom lens stroke, the average of Abbe numbers of the positive lens in the first front lens group is indicated by $\nu_{1ap}$, the average of Abbe numbers of the negative lens in the first front lens group by $\nu_{1an}$, the average of Abbe numbers of the positive lenses in the second front lens group by $\nu_{1bp}$, the average of Abbe numbers of the negative lens in the second front lens group by $\nu_{1bn}$, the Abbe number of the third lens in the rear lens group by $\nu_{23}$, and the Abbe number of the fourth lens in the rear lens group by $\nu_{24}$. These parameters meet the following conditions:

$0.6 < f_1/f_W < 0.9$       (i)

$0.15 < |f_2|/f_T < 0.3$       (ii)

$\nu_{1ap} < \nu_{1an}$       (iii)

$\nu_{1bp} > \nu_{1bn}$       (iv)

$\nu_{23} > \nu_{24}$       (v)

The second type of zoom lens according to the present invention has the same structure as that of the first type of zoom lens and meets the above conditions.

The two types of zoom lenses differ from each other as follows: In the first type of zoom lens, the first and second front lens groups of the front lens group are displaced in unison with each other during zooming movement. In the second type of zoom lens, the distance between the front and rear lens groups is varied and the distance between the first and second front lens groups is also varied during zooming movement.

Since the front lens group has strong positive refracting power, the aberrations thereof tends to be corrected insufficiently. Therefore, the aberrations of the front lens group are required to be corrected by using a negative lens. When the magnification ratio is increased, because it is difficult to maintain a necessary distance between the front and rear lens groups, the principal point of the front lens group should be positioned as closely to an image size as possible. Therefore, the front lens group should be composed of a lens group having a negative focal length, i.e., the first front lens group, and a lens group having a positive focal length, i.e., the second front lens group, the lens groups being arranged in the order specified from the object side for correcting the aberrations.

With the front lens group comprising the first front lens group with the negative focal length and the second front lens group with the positive focal length, the chromatic aberration caused by the magnification tends to be corrected insufficiently. In order to correct the chromatic aberration caused by the magnification while correcting the on-axis chromatic aberration, it is necessary for the first front lens group to be constructed of a positive lens and a negative lens arranged in the order named from the object side. The second front lens group also needs a negative lens so as to correct the chromatic aberration caused by the magnification while correcting the on-axis chromatic aberration. The second front lens group needs to have two or more positive lenses to reduce aberrations because the second front lens group has strong positive refracting power.

In the front lens group thus constructed, the aberrations produced by the positive lens in the second front lens group can be corrected by the negative lens in the first front lens group and the negative lens in the second front lens group. Therefore, the aberrations of the front lens group can well be corrected.

The rear lens group is moved over a large distance from a position near the image plane toward the object side when it is zoomed from the wide angle end to the telephoto end of the zoom lens stroke. Therefore, it is necessary to reduce the aberrations in the rear lens group to suppress variations in aberration on the stroke from the wide angle end to the telephoto end.

According to the present invention, the rear lens group comprises, in the order named from the object side, a positive lens, a negative lens, a negative lens, and a positive lens, as described above. The lens in the rear lens group which is closest to the image plane is a positive lens to correct the chromatic aberration caused by the magnification, the distortion, and the Petzval sum.

The above conditions (i) through (v) will be described below. These conditions, together with the lens structure specified above, are aimed at achieving good lens performance. The third lens in the rear lens group, which has the Abbe number $\nu_{23}$, is of course the negative lens which is the second lens as counted from the image size of the zoom lens. The fourth lens in the rear lens group, which has the Abbe number $\nu_{24}$, is the positive lens positioned closest to the image size.

The condition (i) is concerned with the refracting power of the front lens group. Assuming that the refracting power of the front lens group is represented by $\Phi_1 (= 1/f_1)$ and the refracting power of the rear lens group by $\Phi_2 (= 1/f_2)$, with $\Phi_1 > 0$, the refracting power $\Phi_1$ is given by:

$$\Phi_1 = [-a - \sqrt{a^2 - 4D_T b}]/(2D_T) \quad \text{(I)}$$

where $a = \Phi_W \cdot BF_W - 1 - \Phi_W \cdot D_T$, $b = \Phi_W - \Phi_T \cdot \Phi_W \cdot BF_W$, $\Phi_W$ is the refracting power of the entire zoom lens at the wide angle end, $BF_W$ is the distance from the rear principal point of the rear lens group to the focal plane of the entire zoom lens at the wide angle end, and $D_T$ is the distance between the principal points of the front and rear lens groups at the telephoto end. As is apparent from the equation (I), if $\Phi_W$, $\Phi_T$, $BF_W$, $D_T$ are given, the refracting power $\Phi_1$ of the front group is determined.

In the two-lens-group zoom lens according to the present invention, the distance between the rear lens group and the film surface at the wide angle end and the distance between the front and rear lens groups at the telephoto end are small. Therefore, with the zoom lens having a large magnification ratio, values for $BF_W$ and $D_T$ which allow the lens to be constructed are predetermined, and then the refracting power $\Phi_1$ is determined according to the equation (I).

If the upper limit of the condition (i) were exceeded, the refracting power $\Phi_1$ would be too small, making it impossible to give sufficient values to $BF_W$, $D_T$, and thus making it difficult to construct a zoom lens.

If the magnification of the rear lens group is expressed by $m_2$ and the refracting power of the entire zoom lens is given by $\Phi$, then the magnification $m_2$ is expressed by:

$$m_2 = \Phi_1/\Phi \qquad (II)$$

The lateral aberration produced by the front lens group is magnified $m_2$ by the rear lens group and appears on the focal plane of the entire zoom lens. Of course, the lateral aberration generated by the rear lens group is also added in reality, but only the aberration in the front lens group is considered here. As shown by the equation (II), the magnification $m_2$ becomes larger as the refracting power $\Phi_1$ becomes greater. Therefore, if the aberration produced by the front lens group and appearing on the focal plane of the entire zoom lens is to be kept at the same level, it is necessary to reduce the aberration produced by the front lens group. The greater the refracting power $\Phi_1$, the more difficult it becomes to correct the aberration of the front lens group. If the lower limit of the condition (i) were exceeded, therefore, the refracting power $\Phi_1$ would be too large, making it difficult to correct the aberration of the entire zoom lens.

The condition (ii) is directed to the refracting power of the rear lens group. The magnification $m_{2W}$ of the rear lens group at the wide angle end is given by:

$$m_{2W} = \Phi_1 \cdot \Phi_2 \cdot BF_W/(\Phi_W - \Phi_1) \qquad (III)$$

If $\Phi_1$, $\Phi_W$, $BF_W$ are constant, then the magnification $m_{2W}$ is proportional to the refracting power $\Phi_2$ of the rear lens group. Consequently, as with the condition (I), as the absolute value of $\Phi_2$ becomes larger, the aberrations produced by the front lens group and appearing on the focal plane of the zoom lens would also become larger unless the aberrations produced by the front lens group are reduced. The greater the absolute value of $\Phi_2$, the more difficult it is to correct the aberrations of the rear lens group.

If the lower limit of the condition (ii) were exceeded, i.e., if the absolute value of $\Phi_2$ were too large, it would become difficult to correct the aberrations of the zoom lens in its entirety, and particularly the Petzval sum of the entire zoom lens would be apt to become negative.

The distance $\Delta X_2$ which the rear lens group moves is given by:

$$\Delta X_2 = BF_T - BF_W = \Phi_1(\Phi_T - \Phi_W)/(\Phi_W \cdot \Phi_T \cdot \Phi_2) \qquad (IV)$$

where $BF_T$ is the distance from the rear principal point of the rear lens group to the focal plane of the entire zoom lens at the telephoto end.

Provided $\Phi_1$, $\Phi_W$, $\Phi_T$ are constant, the distance $\Delta X_2$ becomes smaller as the absolute value of the refracting power $\Phi_2$ becomes larger.

The distance $D_T$ between the front and rear lens groups at the telephoto end is expressed as follows:

$$D_T = [\{1 - \Phi_W \cdot BF_W\}/\{\Phi_W(1 - BF_W \cdot \Phi_2)\}] + [\{\Phi_W - \Phi_T\}/\{\Phi_W(1 - BF_W \cdot \Phi_2)\Phi_2\}] \qquad (V)$$

Figure 9:
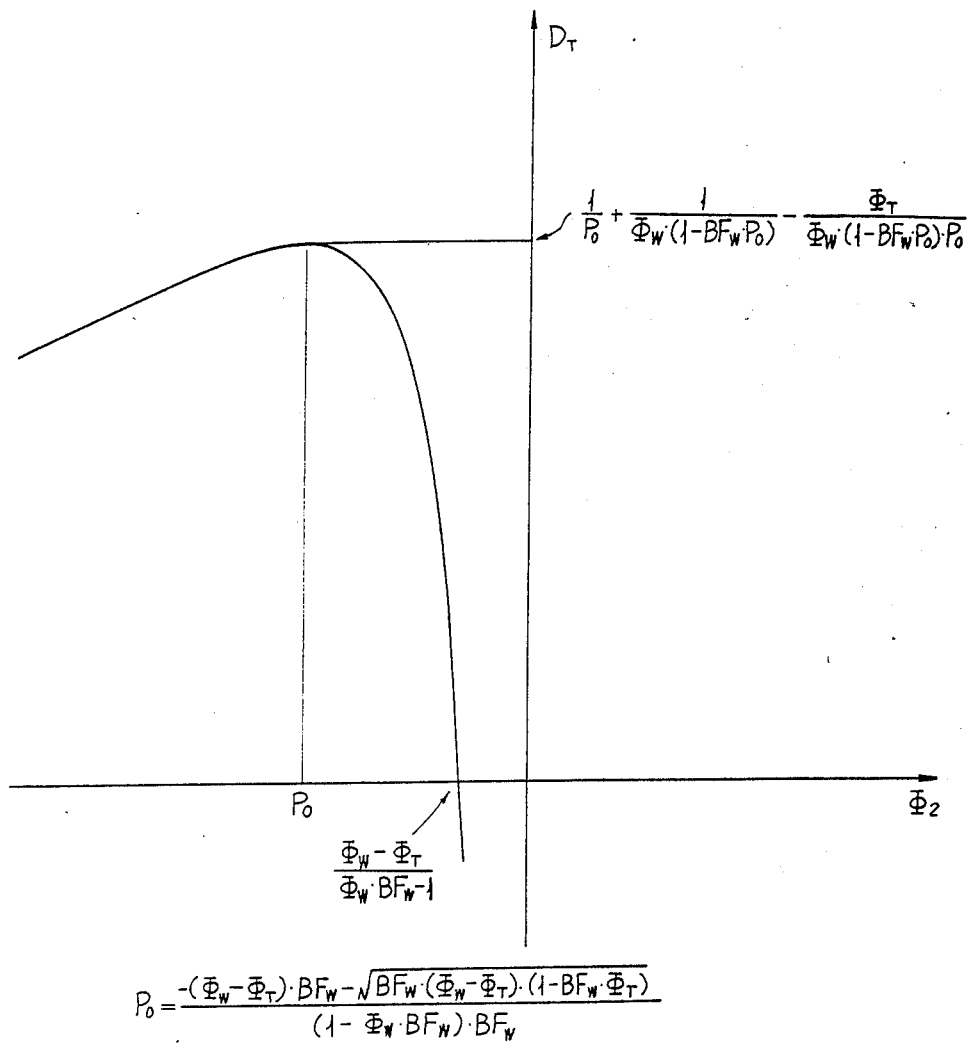
FIG. 9 is a graph showing the relationship between $\Phi_2$ and $D_T$ when $\Phi_2 < 0$.

The relationship between $\Phi_2$ and $D_T$ in the range of $\Phi_2 < 0$ is shown in FIG. 9. In this range, $D_T$ has an extremal value, and $\Phi_2 = P_0$ at this time is given by:

$$\Phi_2 = [-(\Phi_W - \Phi_T)BF_W - \sqrt{(\Phi_W - \Phi_T)(1 - BF_W \cdot \Phi_T)BF_W}]/\{(1 - \Phi_W \cdot BF_W)BF_W\} \qquad (VI)$$

At this time, $D_T$ has a maximum value.

As the refracting power $\Phi_2$ goes smaller from the extremal value, $D_T$ is gradually reduced. Conversely, as the refracting power $\Phi_2$ becomes larger, $D_T$ is sharply reduced.

If the upper limit of the condition (ii) were exceeded, the absolute value of $\Phi_2$ would become excessively small, increasing the distance which the rear lens group moves. Variations in aberration caused by zooming would be increased, and it would be difficult to keep a desired distance between the front and rear lens groups.

The conditions (iii) through (v) serve to correct the chromatic aberration caused by the magnification while maintaining the on-axis chromatic aberration at a good level when the lens arrangement of the present invention is employed. According to the zoom lens of the present invention, the magnification is performed by varying the distance between the front lens group which has a positive focal length and the rear lens group which has a negative focal length. With such a zoom lens, the chromatic aberration caused by the magnification tends to be corrected insufficiently in the front lens group and tends to be corrected excessively in the rear lens group, and it is necessary to effect aberration correction in each of the lens groups. Particularly, with the magnification ratio being about 3, since the distance the rear lens group moves is very large, if the chromatic aberration caused by the magnification were corrected insufficiently in the front lens group and were corrected excessively in the rear lens group, the chromatic aberration caused by the magnification would not be sufficiently corrected in a wide angle of view at the wide angle end and would be overly corrected at the telephoto end, so that good lens performance would not be achieved.

As described above, the front lens group is composed of the first front lens group which has a negative focal length and the second front lens group which has a positive focal length. If the chromatic aberration caused by the magnification and the on-axis aberration are to be corrected, the first and second front lens groups should be constructed as follows:

The first positive lens in the first front lens group is made of a glass material with larger dispersion, and the second negative lens in the first front lens group is made of a glass material with small dispersion. The positive lens in the second front lens group is made of a glass material with small dispersion, and the negative lens in the second front lens group is made of a glass material with large dispersion.

The conditions (iii), (iv) are established in view of the above considerations. If the values were outside the ranges of the conditions (iii), (iv), then it would be difficult to correct the chromatic aberration caused in the front lens group by the magnification.

The chromatic aberration caused in the rear lens group by the magnification and the on-axis chromatic aberration of the rear lens group are liable to be corrected excessively since the rear lens group has large negative refracting power. Therefore, it is necessary that the positive lens in the rear lens group be made of a glass material with large dispersion and the negative lens in the rear lens group be made of a glass material with small dispersion. Especially, the positive lens positioned near the image plane is effective to properly correct the excessively corrected chromatic aberration caused by the magnification, and performs such correcting function by employing larger dispersion than that of the third negative lens.

If the third negative lens and the fourth positive lens, as counted from the object side, in the rear lens group are joined together to increase the dispersion of the positive lens, then it is easy to properly correct the excessively corrected chromatic aberration caused by the magnification. The condition (v) is established in view of this consideration.

It is preferable that the radius of curvature $R_{2r}$ of the final surface of the rear lens group meet the condition:

$$-1.7 < R_{2r}/f_W < -0.8 \tag{iv}$$

This condition serves to maintain a desired distance between the rear lens group and the film surface while correcting the chromatic aberration caused by the magnification, the distortion, and the Petzval sum.

If the lower limit of this condition were exceeded, the excessively corrected chromatic aberration caused by the magnification and the excessively corrected distortion would be generated by the final surface of the rear lens group, the Petzval sum would tend to go negative, and difficulty would be experienced in correcting these aberrations. If the upper limit of the condition were exceeded, the radius of curvature of the final surface would be too small, requiring the fourth positive lens in the rear lens group to be thicker, and the refracting power of the final surface would be too strong to maintain a desired distance between the rear lens group and the film surface. The cost of the lens would be increased, and the weight of the lens would also be increased.

Inasmuch as the rear lens group has large refracting power, its spherical aberration tends to be corrected insufficiently. In EXAMPLES described later on, the spherical aberration is corrected by giving an aspherical surface to the positive lens in the second front lens group. It is particularly effective to correct the spherical aberration by using an aspherical surface as the final convex surface.

As described above, the first and second front lens groups of the front lens group in the first type of zoom lens are displaced in unison with each other during zooming movement.

When the two-lens-group zoom lens of the present invention effects zooming movement, since the positional relationship between the front and rear lens group is largely varied, if the front lens group has a diaphragm, the manner in which aberrations are produced in the rear lens group is varied. The manner in which high-order aberrations is also varied by changes in the angle of view which are brought about by zooming. Therefore, it is ideal to well correct the aberrations in each of the front and rear lens groups up to the maximum angle of view to reduce variations in aberration in the overall zoom lens upon zooming movement for thereby achieving good lens performance throughout the entire range of zooming. Because this is quite difficult to accomplish, however, good performance is achieved by the zoom lens of the first type by balancing variations in aberration in the entire zooming range which are caused by remaining aberrations in each of the lens groups, while taking high-order aberrations into account.

The performance of the zoom lens may however be greatly lowered by machining errors, assembling errors, focusing errors, or the like because the central position of the best image plane and the position of the best image plane in the meridional direction at about 70% of the image height are spaced from each other.

This problem is solved in the second type of zoom lens by varying the distance between the first and second front lens group upon zooming movement of the zoom lens.

In the following description, the term "peripheral means the meridional direction near 70% of the image height.

By widening the distance between the first and second front lens groups, the amount of excessively corrected astigmatism is increased mainly in the front lens group near an intermediate zooming range point, and the amount of excessively corrected astigmatism and the amount of insufficiently corrected spherical aberration are increased mainly in the front lens group near the telephoto end. When the refracting power of the first lens group is small, the focal length and back focus of the entire zoom lens vary little even if the distance between the front and rear front lens groups is varied. As changes in the distance between the front and rear lens groups which are required to correct the small variations in the focal length and back focus are also small, variations in aberration in the rear lens group are also small. Therefore, by utilizing changes in the astigmatism and spherical aberration in the front lens group owing to changes in the distance between the first and second front lens group, the central position of the best image plane and the peripheral position of the best image plane can be aligned without affecting the movement of the lens groups and other aberrations.

According to the present invention, therefore, there is provided a compact zoom lens which has a wide angle of view with the half angle of view being about 30° and a large magnification ratio of 2.8 or more, and which is good in performance and short in in its entire length at the wide angle end.

Eight specific EXAMPLES of the present invention will be described below.

EXAMPLES 1 through 4 indicate zoom lenses of the first type, and EXAMPLES 5 through 8 show zoom lenses of the second type.

In each of EXAMPLES, $r_i$ denotes the radius of curvature of the ith lens surface as counted from the object side, $d_i$ the ith inter-surface distance as counted from the object side, and $n_j$ and $v_j$ the refractive index and Abbe number, respectively, of the jth lens as counted from the object side. The aspherical surface is defined as is well known according to:

$$X = (1/r_i)Y^2/\{1 + \sqrt{1-(Y/r_i)^2}\} + A_4Y^4 + A_6Y^6 + A_8Y^8$$

when the optical axis is an X axis, the axis normal to the optical axis is a Y axis, the origin is at the intersection of the X and Y axes, and the vertex of the aspherical surface is at the origin. The aspherical surface is indicated by * in each of EXAMPLES.

EXAMPLE 1 (see FIG. 1):

f=36~102, 1:3.49~9.90, Half angle of view: 30.6°~12°

| i | $r_i$ | $d_i$ | J | $n_j$ | $\nu_j$ |
|---|---|---|---|---|---|
| 1 | 28.136 | 2.22 | 1 | 1.80518 | 25.5 |
| 2 | 59.005 | 3.17 | | | |
| 3* | −31.37 | 3.75 | 2 | 1.835 | 43 |
| 4 | 175.983 | 4.39 | | | |
| 5* | 32.716 | 2.5 | 3 | 1.58913 | 61.3 |
| 6 | −14.88 | 1 | 4 | 1.834 | 37.3 |
| 7 | −99.312 | 0.3 | | | |
| 8 | 29.57 | 0.94 | 5 | 1.8503 | 32.2 |
| 9 | 17.427 | 0.3 | | | |
| 10 | 20.834 | 3 | 6 | 1.64 | 60.2 |
| 11* | −21.388 | Variable | | | |
| 12 | −105.331 | 3.58 | 7 | 1.5927 | 35.5 |
| 13 | −22.694 | 2.53 | | | |
| 14 | −25.016 | 1.15 | 8 | 1.7725 | 49.6 |
| 15 | 121.231 | 5.9 | | | |
| 16 | −14.788 | 1.6 | 9 | 1.7725 | 49.6 |
| 17 | −5899.515 | 4.5 | 10 | 1.84666 | 23.8 |
| 18 | −39.86 | | | | |

| | | | |
|---|---|---|---|
| f | 36 | 60.597 | 102 |
| $d_{11}$ | 12.167 | 4.989 | 0.724 |

Figure 3:
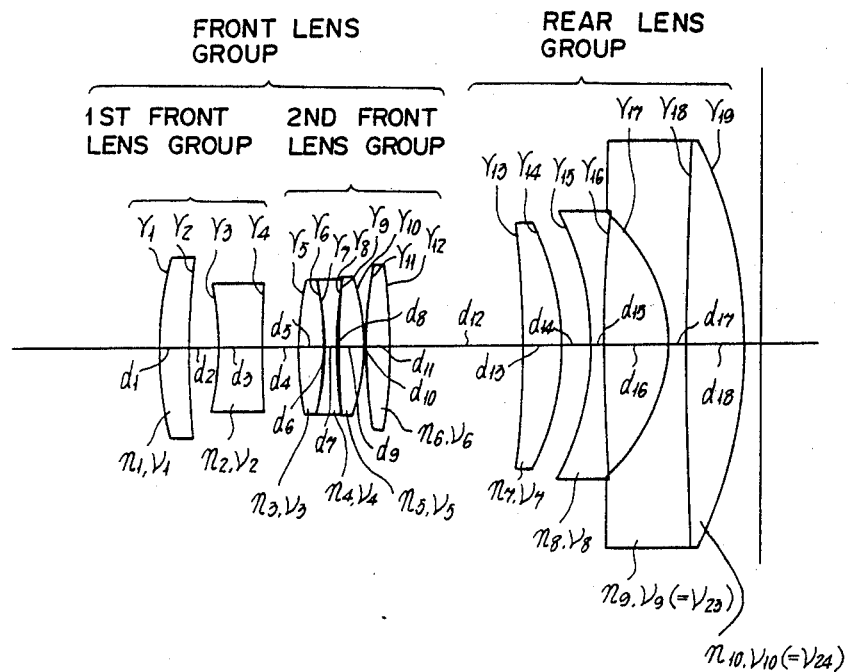
FIG. 3 is a schematic view of a zoom lens according to EXAMPLE 2.

$r_3^*: A_4 = -2.73517 \cdot 10^{-6}, A_6 = -8.35041 \cdot 10^{-8}, A_8 = 1.46263 \cdot 10^{-9}$
$r_5^*: A_4 = -1.2898 \cdot 10^{-6}, A_6 = -7.20087 \cdot 10^{-8}, A_8 = -2.52889 \cdot 10^{-9}$
$r_{11}^*: A_4 = 1.48295 \cdot 10^{-5}, A_6 = 1.05343 \cdot 10^{-7}, A_8 = -4.54795 \cdot 10^{-9}$ EXAMPLE 2 (see FIG. 3):

f=36~102, 1:3.57~10.12, Half angle of view: 30.5°~12°

| i | $r_i$ | $d_i$ | J | $n_j$ | $\nu_j$ |
|---|---|---|---|---|---|
| 1 | 28.061 | 2.6 | 1 | 1.80518 | 25.5 |
| 2 | 64.571 | 2.42 | | | |
| 3 | −23.719 | 3.82 | 2 | 1.7725 | 49.6 |
| 4 | 830.573 | 2.91 | | | |
| 5 | 23.243 | 2.1 | 3 | 1.61765 | 55.2 |
| 6* | −31.649 | 0.3 | | | |
| 7 | −22.672 | 0.8 | 4 | 1.8503 | 32.2 |
| 8 | 29.697 | 0.3 | | | |
| 9 | 71.601 | 2.1 | 5 | 1.58913 | 61.3 |
| 10 | −18.11 | 0.2 | | | |
| 11 | 35.223 | 2.1 | 6 | 1.58913 | 61.3 |
| 12* | −41.908 | Variable | | | |
| 13 | −82.219 | 3.4 | 7 | 1.5927 | 35.5 |
| 14 | −21.081 | 2.4 | | | |
| 15 | −23.454 | 1.1 | 8 | 1.7725 | 49.6 |
| 16 | 130.621 | 5.4 | | | |
| 17 | −14.113 | 1.5 | 9 | 1.7725 | 49.6 |
| 18 | 343.982 | 5.1 | 10 | 1.80518 | 25.5 |
| 19 | −37.839 | | | | |

| | | | |
|---|---|---|---|
| f | 36 | 60.597 | 131 |
| $d_{12}$ | 11.289 | 4.907 | 1.116 |

Figure 5:
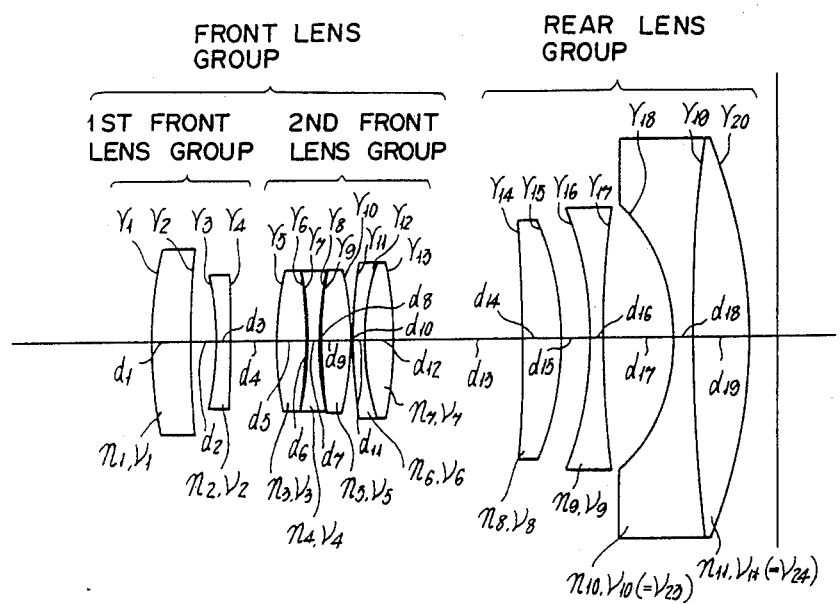
FIG. 5 is a schematic view of a zoom lens according to EXAMPLE 3.

$r_6^*: A_4 = 1.59205 \cdot 10^{-6}, A_6 = 1.7935 \cdot 10^{-8}, A_8 = -1.96709 \cdot 10^{-10}$
$r_{12}^*: A_4 = 4.69171 \cdot 10^{-7}, A_6 = 1.15662 \cdot 10^{-7}, A_8 = -1.63555 \cdot 10^{-9}$ EXAMPLE 3 (see FIG. 5):

f=38~114, 1:3.55~10.66, Half angle of view: 29°~10.7°

| i | $r_i$ | $d_i$ | J | $n_j$ | $\nu_j$ |
|---|---|---|---|---|---|
| 1 | 32.992 | 3.52 | 1 | 1.80518 | 25.5 |
| 2 | 87.504 | 2.1 | | | |
| 3 | −23.323 | 1.19 | 2 | 1.7725 | 49.6 |
| 4 | −497.747 | 3.86 | | | |
| 5 | 25.048 | 2.4 | 3 | 1.58913 | 61.3 |
| 6* | −38.01 | 0.3 | | | |
| 7 | −28.35 | 0.9 | 4 | 1.834 | 37.3 |
| 8 | 30.563 | 0.3 | | | |

-continued

| | | | | | |
|---|---|---|---|---|---|
| 9 | 49.772 | 2.4 | 5 | 1.58913 | 61.3 |
| 10 | −22.947 | 0.2 | | | |
| 11 | 46.953 | 0.9 | 6 | 1.8061 | 33.3 |
| 12 | 19.24 | 2.4 | 7 | 1.6968 | 55.5 |
| 13* | −37.052 | Variable | | | |
| 14 | −120.953 | 3.4 | 8 | 1.5927 | 35.5 |
| 15 | −24.496 | 2.4 | | | |
| 16 | −29.363 | 1.1 | 9 | 1.7725 | 49.6 |
| 17 | 86.534 | 6 | | | |
| 18 | −15.34 | 1.5 | 10 | 1.8042 | 46.5 |
| 19 | 146.645 | 4.8 | 11 | 1.84666 | 23.8 |
| 20 | −43.91 | | | | |

| f | 38 | 65.818 | 114 |
|---|---|---|---|
| $d_{13}$ | 10.985 | 4.193 | 0.271 |

Figure 7:
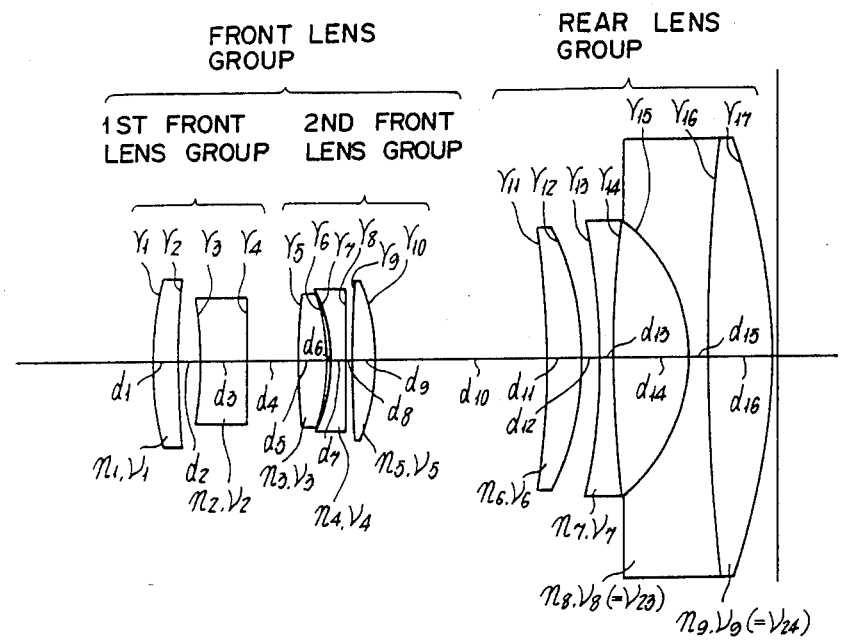
FIG. 7 is a schematic view of a zoom lens according to EXAMPLE 4.

$r_6^*: A_4 = 4.1276 \cdot 10^{-6}, A_6 = 3.0103 \cdot 10^{-8}, A_8 = -4.32715 \cdot 10^{-10}$
$r_{13}^*: A_4 = 3.05607 \cdot 10^{-6}, A_6 = 1.30471 \cdot 10^{-7}, A_8 = -1.6649 \cdot 10^{-9}$ EXAMPLE 4 (see FIG. 7):

$f = 36 \sim 102$, $1:3.57 \sim 10.11$, Half angle of view: $30.6° \sim 12°$

| i | $r_i$ | $d_i$ | J | $n_j$ | $\nu_j$ |
|---|---|---|---|---|---|
| 1 | 28.444 | 2.32 | 1 | 1.80518 | 25.5 |
| 2 | 86.261 | 1.81 | | | |
| 3* | −34.563 | 3.93 | 2 | 1.835 | 43 |
| 4 | 186.174 | 4.41 | | | |
| 5* | 50.424 | 2.5 | 3 | 1.51823 | 59 |
| 6 | −15.427 | 0.5 | | | |
| 7 | −13.214 | 1.18 | 4 | 1.80518 | 25.5 |
| 8 | −209.816 | 0.42 | | | |
| 9 | 96.471 | 2 | 5 | 1.835 | 43 |
| 10* | −18.001 | Variable | | | |
| 11 | −75.796 | 3 | 6 | 1.5927 | 35.5 |
| 12 | −24.655 | 1.43 | | | |
| 13 | −56.269 | 1.15 | 7 | 1.7725 | 49.6 |
| 14 | 101.682 | 6.3 | | | |
| 15 | −14.897 | 1.6 | 8 | 1.7725 | 49.6 |
| 16 | 158.079 | 5.5 | 9 | 1.84666 | 23.8 |
| 17 | −51.777 | | | | |

| f | 36 | 60.597 | 102 |
|---|---|---|---|
| $d_{10}$ | 14.516 | 5.677 | 0.426 |

$r_3^*: A_4 = 6.58663 \cdot 10^{-7}, A_6 = -1.82071 \cdot 10^{-9}, A_8 = -1.59764 \cdot 10^{-9}$
$r_5^*: A_4 = -3.55818 \cdot 10^{-6}, A_6 = 9.41893 \cdot 10^{-8}, A_8 = 5.63982 \cdot 10^{-9}$
$r_{10}^*: A_4 = 1.7705 \cdot 10^{-5}, A_6 = 1.72229 \cdot 10^{-7}, A_8 = -3.04356 \cdot 10^{-10}$ The relationship between the parameters in the conditions (i) through (v) and above EXAMPLES is given in the following Table 1:

TABLE 1

| EXAMPLES | 1 | 2 | 3 | 4 |
|---|---|---|---|---|
| $f_1/f_W$ | 0.755 | 0.718 | 0.714 | 0.796 |
| $|f_2|/f_T$ | 0.23 | 0.215 | 0.197 | 0.268 |
| $\nu_{1ap}$ | 25.5 | 25.5 | 25.5 | 25.5 |
| $\nu_{1an}$ | 43 | 49.6 | 49.6 | 43 |
| $\nu_{1bp}$ | 60.7 | 59.2 | 59.3 | 51 |
| $\nu_{1bn}$ | 34.8 | 32.2 | 35.3 | 25.5 |
| $\nu_{23}$ | 49.6 | 49.6 | 46.5 | 49.6 |
| $\nu_{24}$ | 23.8 | 25.5 | 23.8 | 23.8 |
| $R_{2r}/f_W$ | −1.107 | −1.051 | −1.156 | −1.438 |

The lenses of the above EXAMPLES shown in FIGS. 1, 3, 5, 7 are of an arrangement at the wide angle end.

Figure 2:
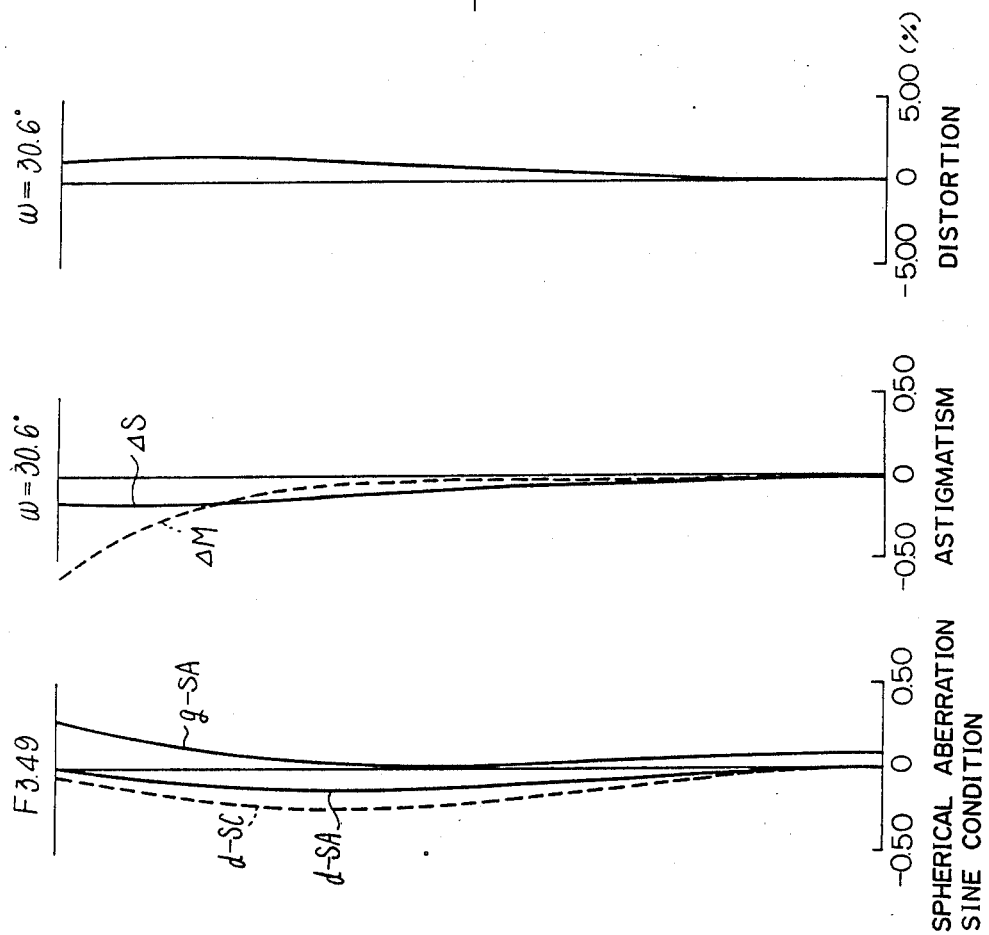
FIGS. 2(a) through 2(c) are diagrams showing aberrations of the zoom lens of EXAMPLE 1.
Figure 4B:
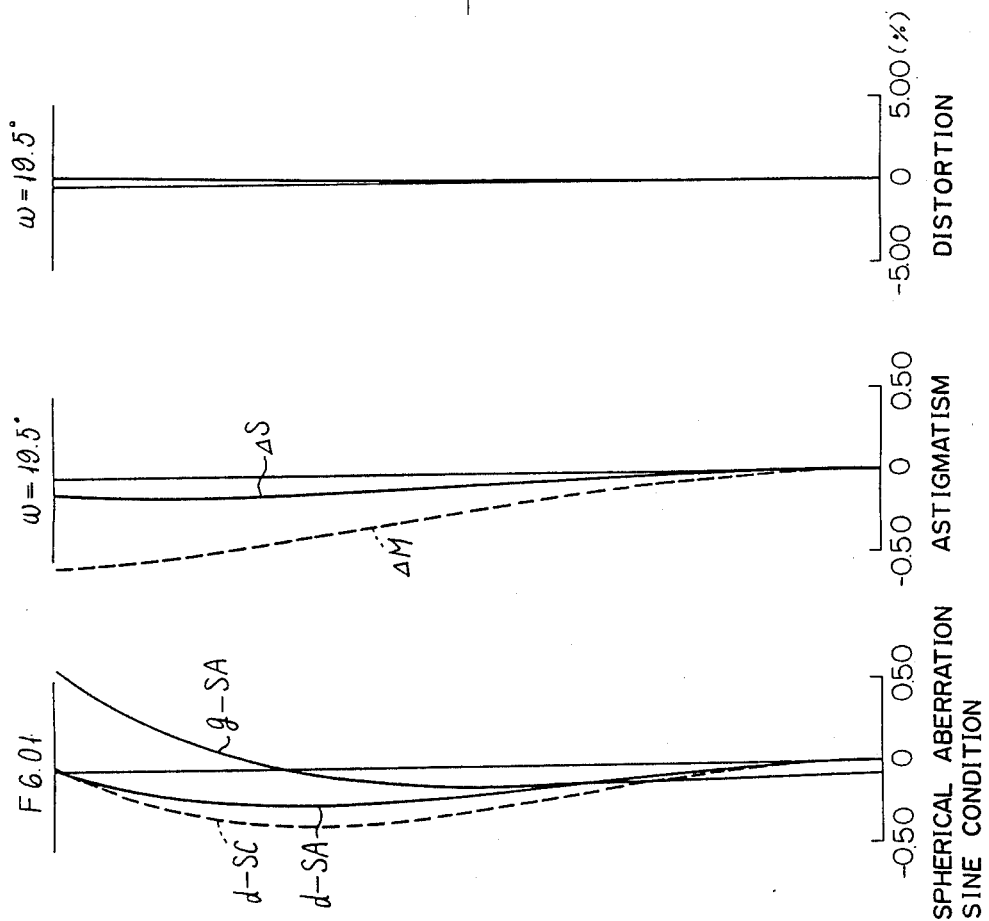
Figure 6B:
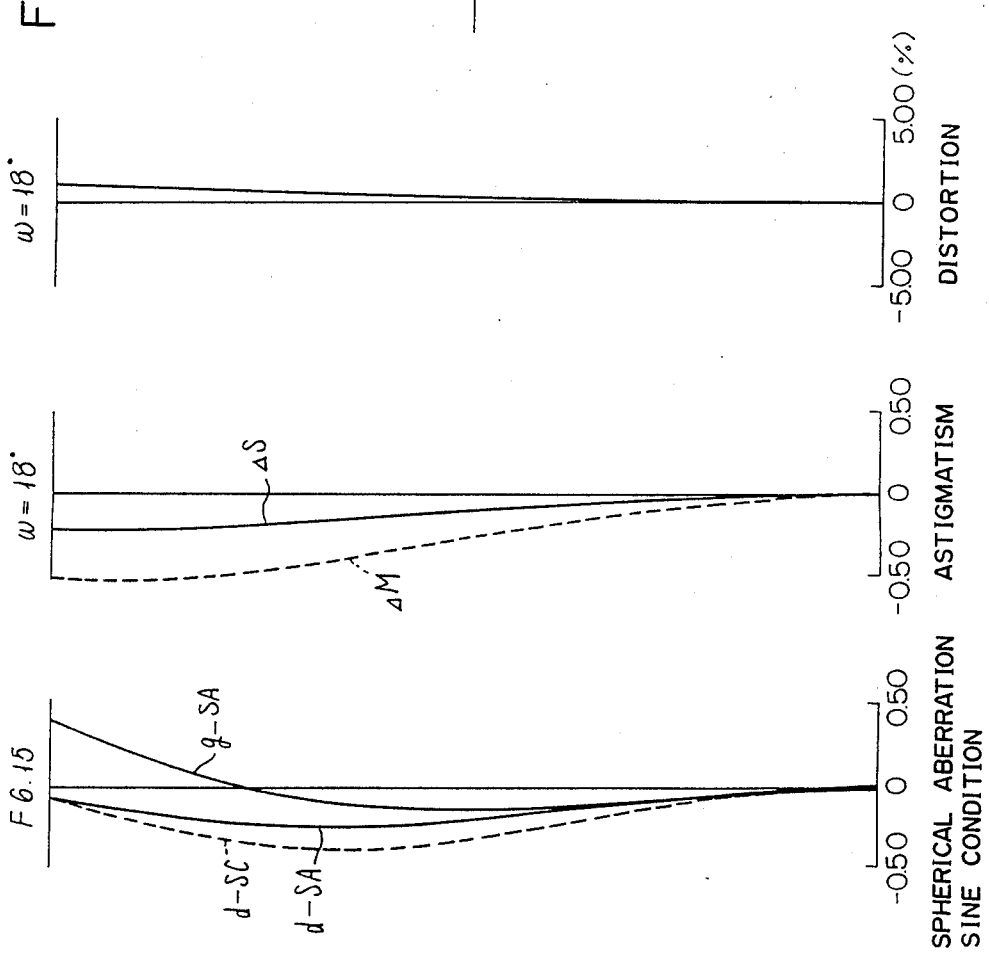
Figure 8A:
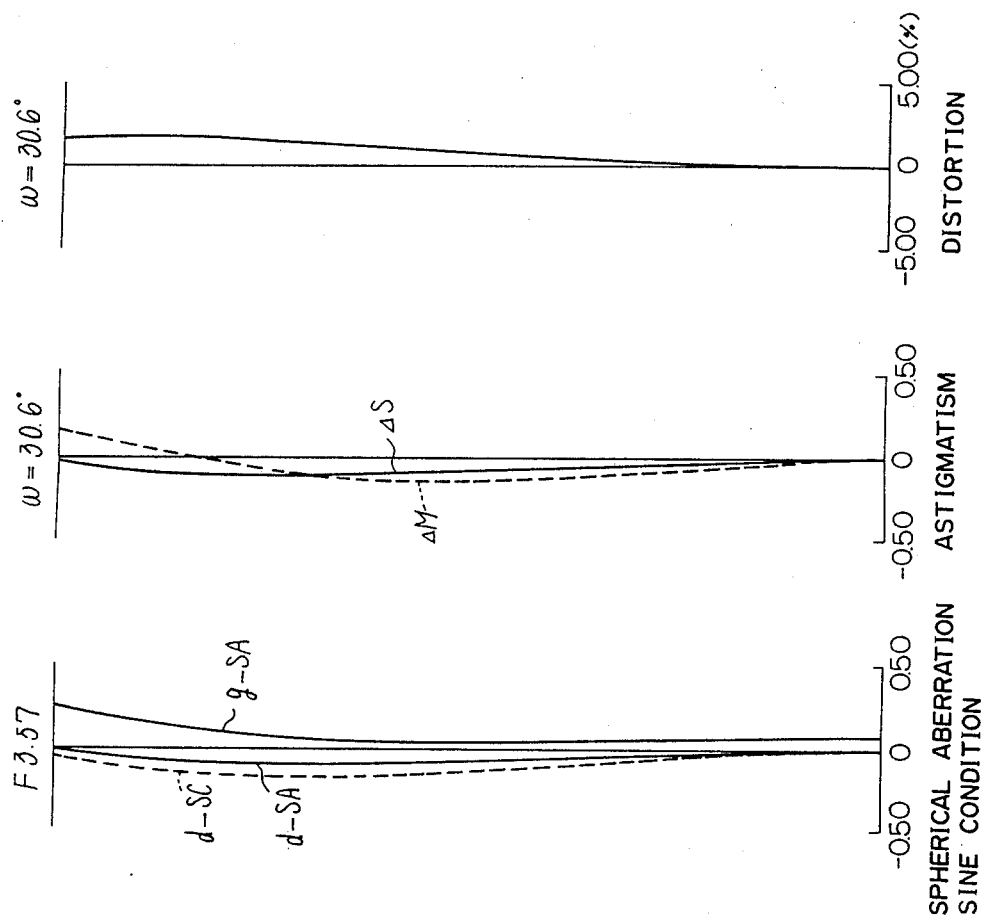
FIGS. 8(a) through 8(c) are diagrams showing aberrations of the zoom lens of EXAMPLE 4.
Figure 8B:
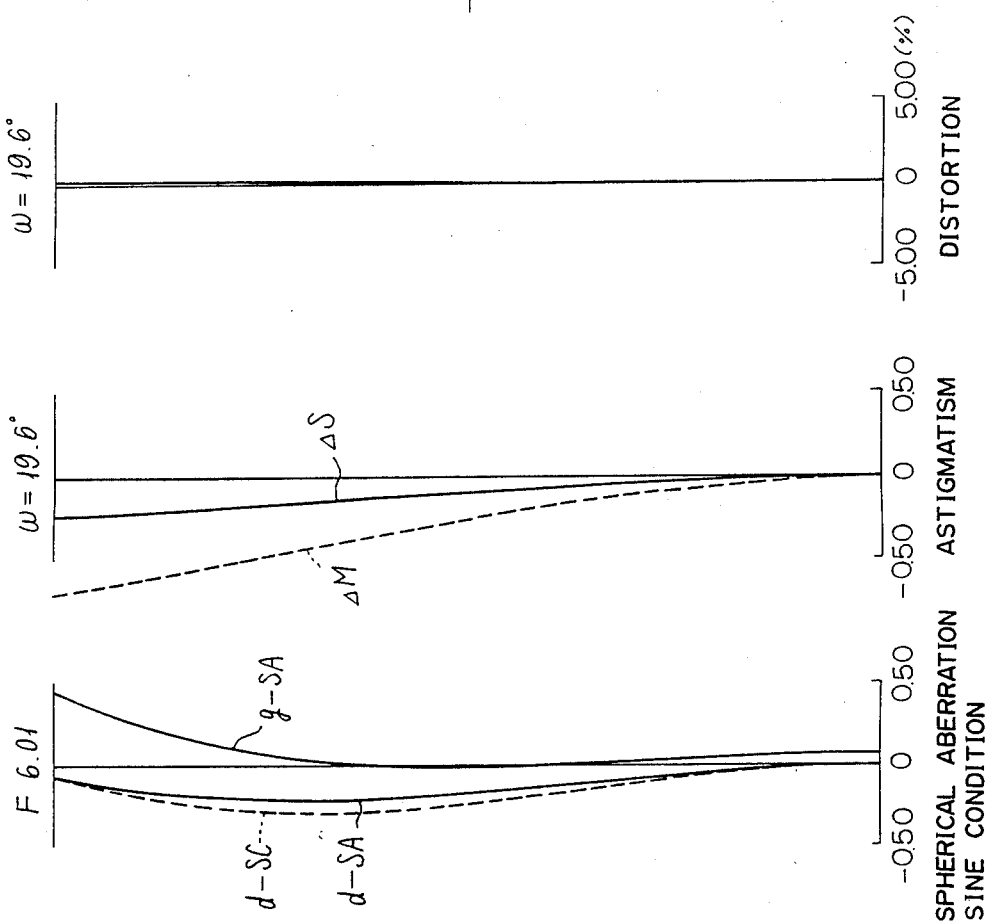
Figure 8C:
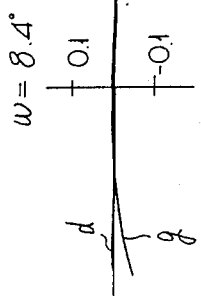
Figure 8C:
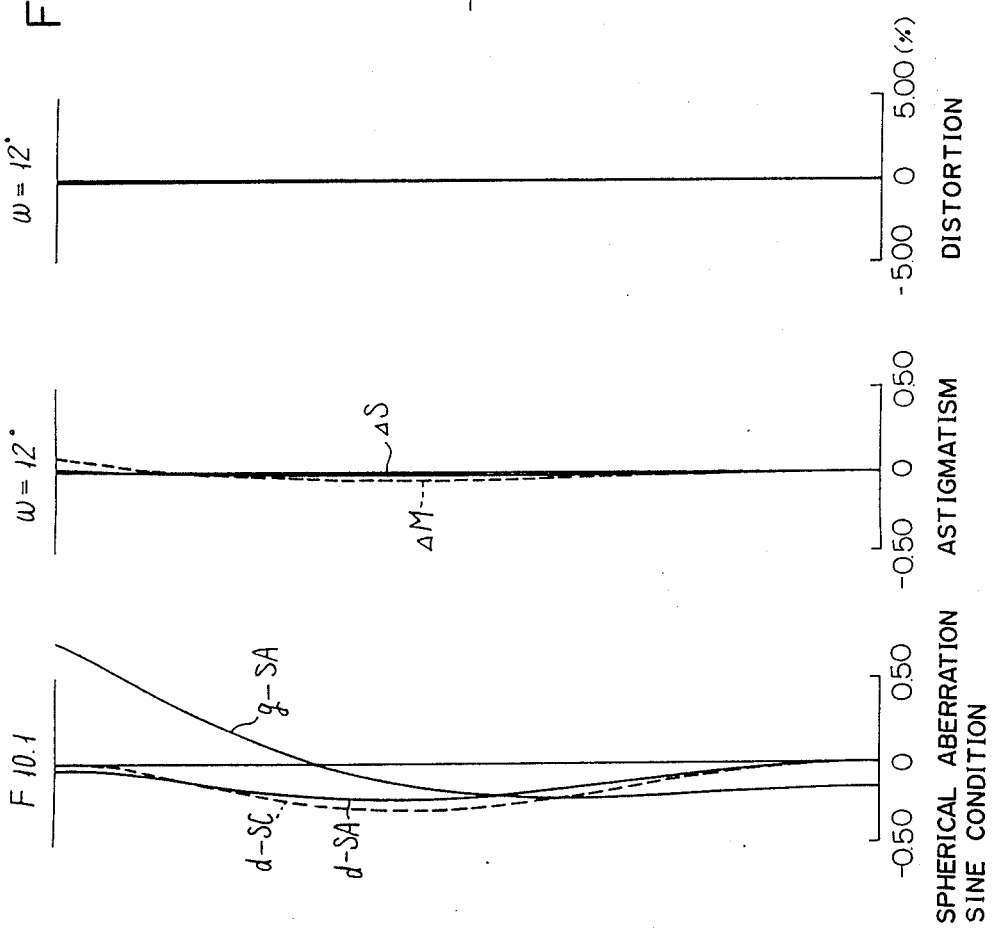

FIGS. 2(a) through 2(c) show aberrations of the zoom lens of EXAMPLE 1, FIGS. 4(a) through 4(c) aberrations of the zoom lens of EXAMPLE 2, FIGS. 6(a) through 6(c) aberrations of the zoom lens of EXAMPLE 3, and FIGS. 8(a) through 8(c) aberrations of the zoom lens of EXAMPLE 4. FIGS. 2(a), 4(a), 6(a), 8(a) show aberrations at the wide angle end, FIGS. 2(b), 4(b), 6(b), 8(b) aberrations of the intermediate zoom range position, and FIGS. 2(c), 4(c), 6(c), 8(c) aberrations at the telephoto end. Denoted at d-SA in the spherical aberration for d-line, g-SA the spherical aberration for g-line, d-SC the sine condition for d-line, ΔS the sagittal image plane, ΔM the meridional image plane, d the d-line, g the g-line, and ω the half angle of view.

Figure 10:
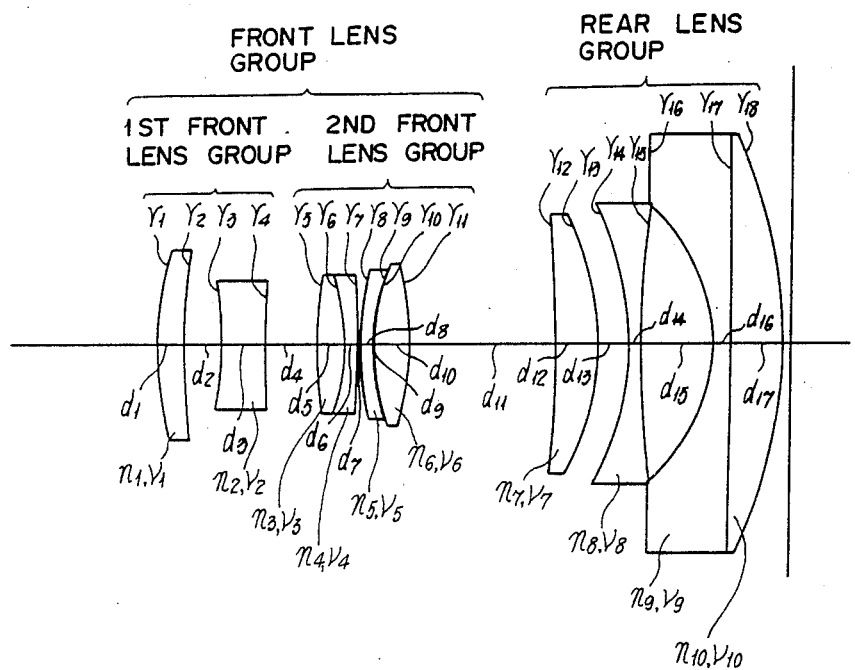
FIG. 10 is a schematic view of a zoom lens according to EXAMPLE 5.
Figure 11A:
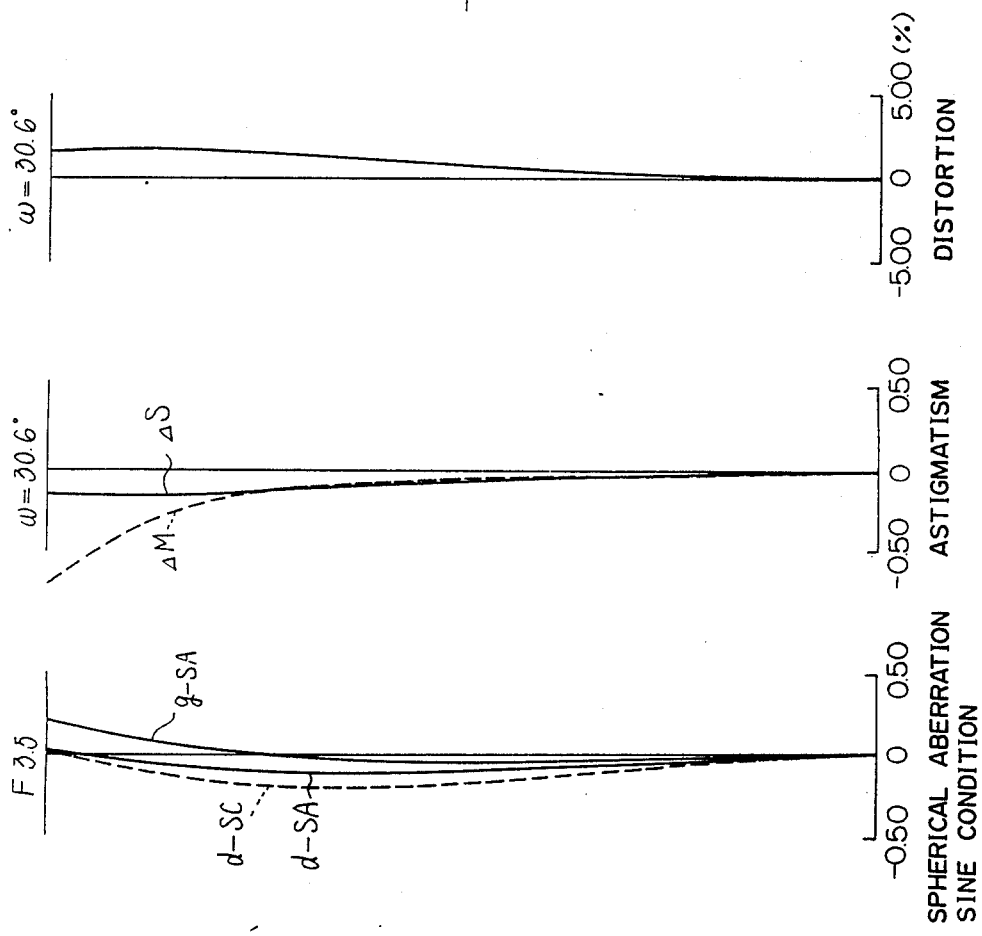
Figure 11D:
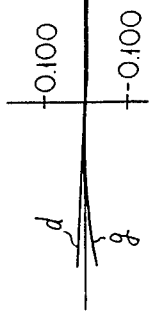
Figure 11D:
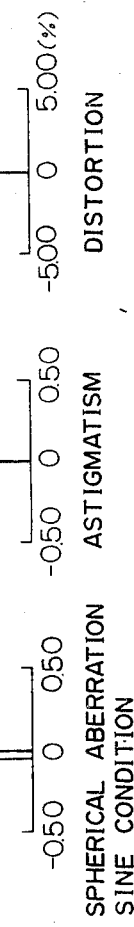
Figure 11E:
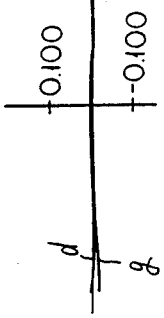
Figure 11E:
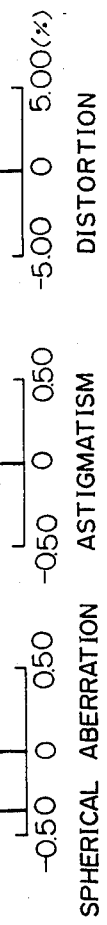

EXAMPLE 5 (see FIG. 10):

$f = 36 \sim 102$, $1:3.5 \sim 9.92$, Half angle of view: $30.6° \sim 12°$

| i | $r_i$ | $d_i$ | J | $n_j$ | $\nu_j$ |
|---|---|---|---|---|---|
| 1 | 28.226 | 2.22 | 1 | 1.80518 | 25.5 |
| 2 | 59.249 | 3.14 | | | |
| 3* | −30.273 | 3.82 | 2 | 1.835 | 43 |
| 4 | 223.875 | Variable | | | |
| 5* | 32.631 | 2.5 | 3 | 1.58913 | 61.3 |
| 6 | −16.103 | 1 | 4 | 1.834 | 37.3 |
| 7 | −98.744 | 0.3 | | | |
| 8 | 29.645 | 0.94 | 5 | 1.8503 | 32.2 |
| 9 | 17.42 | 0.3 | | | |
| 10 | 20.928 | 3 | 6 | 1.64 | 60.2 |
| 11* | −22.16 | Variable | | | |
| 12 | −105.309 | 3.58 | 7 | 1.5927 | 35.5 |
| 13 | −22.641 | 2.53 | | | |
| 14 | −25.053 | 1.15 | 8 | 1.7725 | 49.6 |
| 15 | 108.632 | 5.9 | | | |
| 16 | −14.919 | 1.6 | 9 | 1.7725 | 49.6 |
| 17 | −1467.144 | 4.5 | 10 | 1.84666 | 23.8 |

| i | $r_i$ | $d_i$ | J | $n_j$ | $\nu_j$ |
|---|---|---|---|---|---|
| 18 | −39.513 | | | | |

When the distance between the front and rear groups is variable:

| f | 36 | 60.597 | 102 |
|---|---|---|---|
| $d_4$ | 4.258 | 4.404 | 3.998 |
| $d_{11}$ | 12.176 | 4.952 | 0.797 |

When the distance between the front and rear groups is invariable:

| f | 36 | 60.597 | 102 |
|---|---|---|---|
| $d_4$ | 4.258 | 4.258 | 4.258 |
| $d_{11}$ | 12.176 | 4.998 | 0.734 |

$r_3^*: A_4 = -2.84868 \cdot 10^{-6}, A_6 = -7.19719 \cdot 10^{-8}, A_8 = 1.26272 \cdot 10^{-9}$
$r_5^*: A_4 = -1.42765 \cdot 10^{-6}, A_6 = -6.50791 \cdot 10^{-8}, A_8 = -2.75008 \cdot 10^{-9}$
$r_{11}^*: A_4 = 1.50258 \cdot 10^{-5}, A_6 = 9.85356 \cdot 10^{-8}, A_8 = -4.51324 \cdot 10^{-9}$

Figure 12:
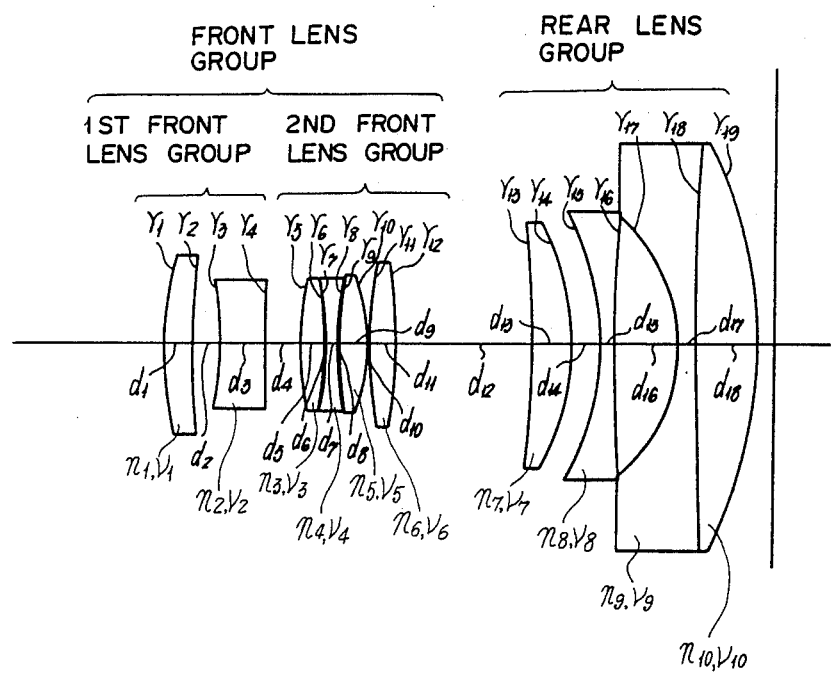
FIG. 12 is a schematic view of a zoom lens according to EXAMPLE 6.
Figure 13A:
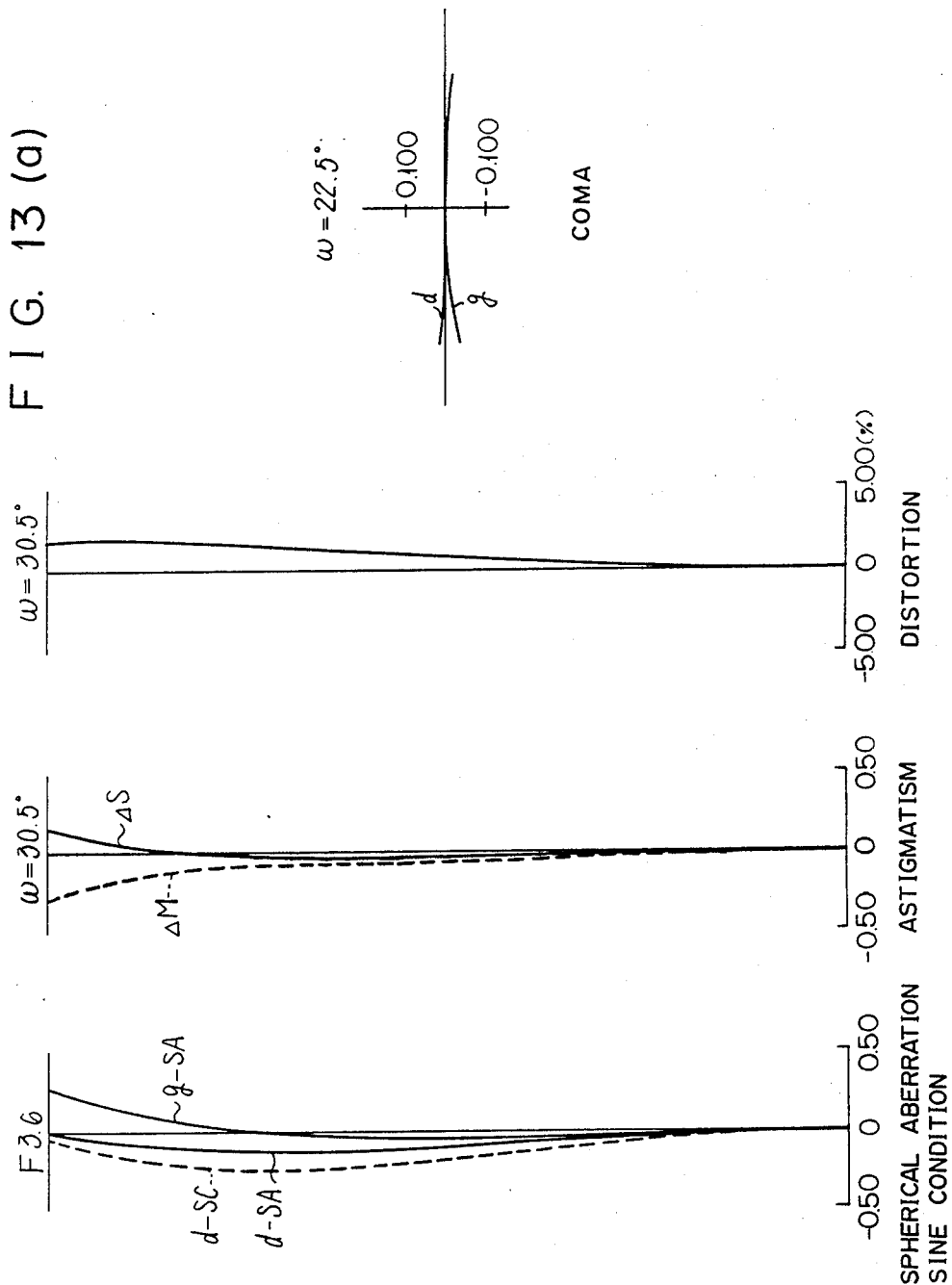
Figure 13E:
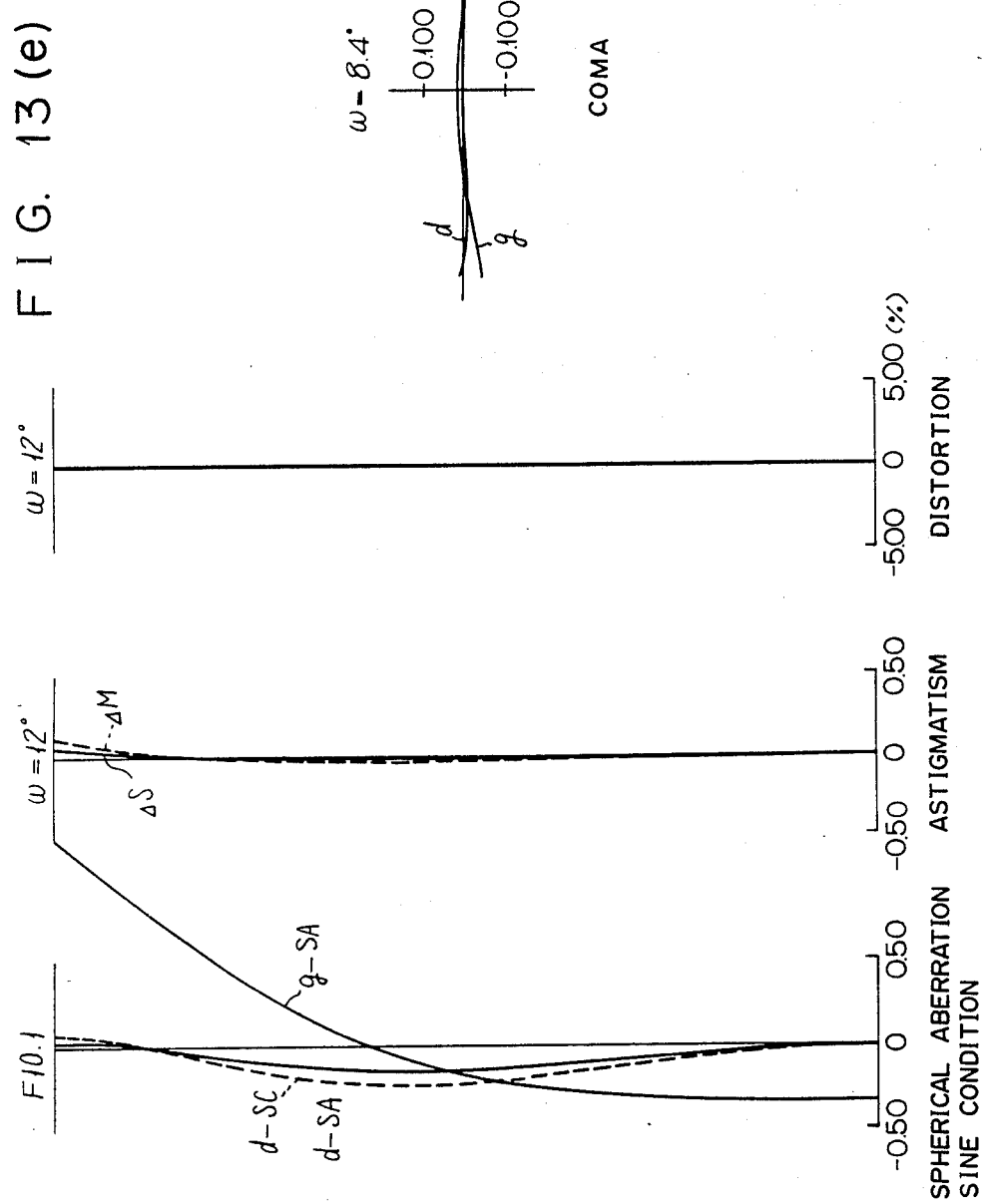

EXAMPLE 6 (see FIG. 12):

$f = 36 \sim 102$, $1:3.57 \sim 10.12$, Half angle of view: $30.5° \sim 12°$

| i | $r_i$ | $d_i$ | J | $n_j$ | $\nu_j$ |
|---|---|---|---|---|---|
| 1 | 28.061 | 2.6 | 1 | 1.80518 | 25.5 |
| 2 | 64.571 | 2.42 | | | |
| 3 | −23.719 | 3.82 | 2 | 1.7725 | 49.6 |
| 4 | 830.573 | Variable | | | |
| 5 | 23.243 | 2.1 | 3 | 1.61765 | 55.2 |
| 6* | −31.649 | 0.3 | | | |
| 7 | −22.672 | 0.8 | 4 | 1.8503 | 32.2 |
| 8 | 29.697 | 0.3 | | | |
| 9 | 71.601 | 2.1 | 5 | 1.58913 | 61.3 |
| 10 | −18.11 | 0.2 | | | |
| 11 | 35.223 | 2.1 | 6 | 1.58913 | 61.3 |
| 12* | −41.908 | Variable | | | |
| 13 | −82.219 | 3.4 | 7 | 1.5927 | 35.5 |
| 14 | −21.081 | 2.4 | | | |
| 15 | −23.454 | 1.1 | 8 | 1.7725 | 49.6 |
| 16 | 130.621 | 5.4 | | | |
| 17 | −14.113 | 1.5 | 9 | 1.7725 | 49.6 |
| 18 | 343.982 | 5.1 | 10 | 1.80518 | 25.5 |
| 18 | −37.839 | | | | |

When the distance between the front and rear groups is variable:

| f | 36 | 60.597 | 131 |
|---|---|---|---|
| $d_4$ | 2.91 | 3.027 | 2.723 |
| $d_{12}$ | 11.289 | 4.872 | 1.16 |

When the distance between the front and rear groups is invariable:

| f | 36 | 60.597 | 131 |
|---|---|---|---|
| $d_4$ | 2.91 | 2.91 | 2.91 |
| $d_{12}$ | 11.289 | 4.907 | 1.116 |

$r_6^*: A_4 = 1.59205 \cdot 10^{-6}, A_6 = 1.7935 \cdot 10^{-8}, A_8 = -1.96709 \cdot 10^{-10}$
$r_{12}^*: A_4 = 4.69171 \cdot 10^{-7}, A_6 = 1.15662 \cdot 10^{-7}, A_8 = -1.63555 \cdot 0 \; 10^{-9}$

Figure 14:
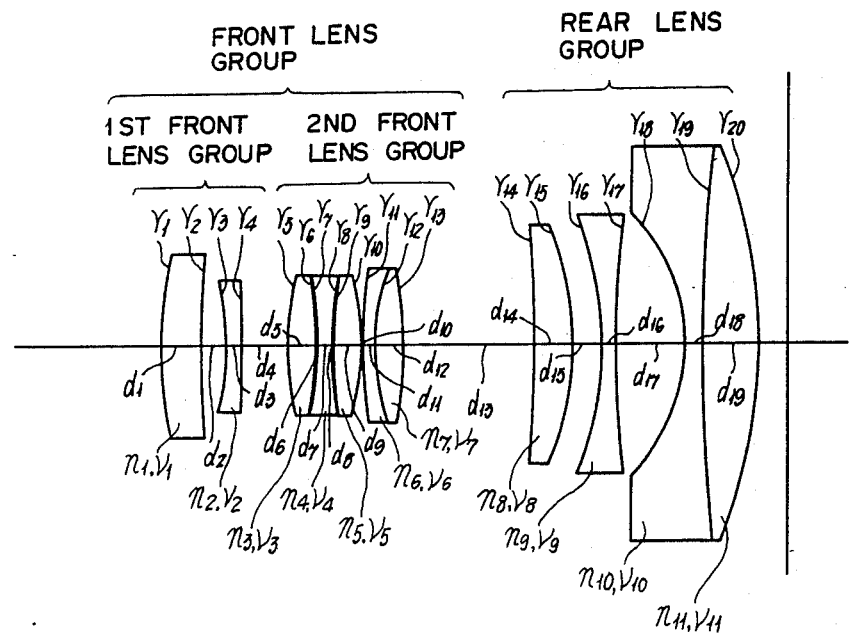
FIG. 14 is a schematic view of a zoom lens according to EXAMPLE 7.
Figure 15A:
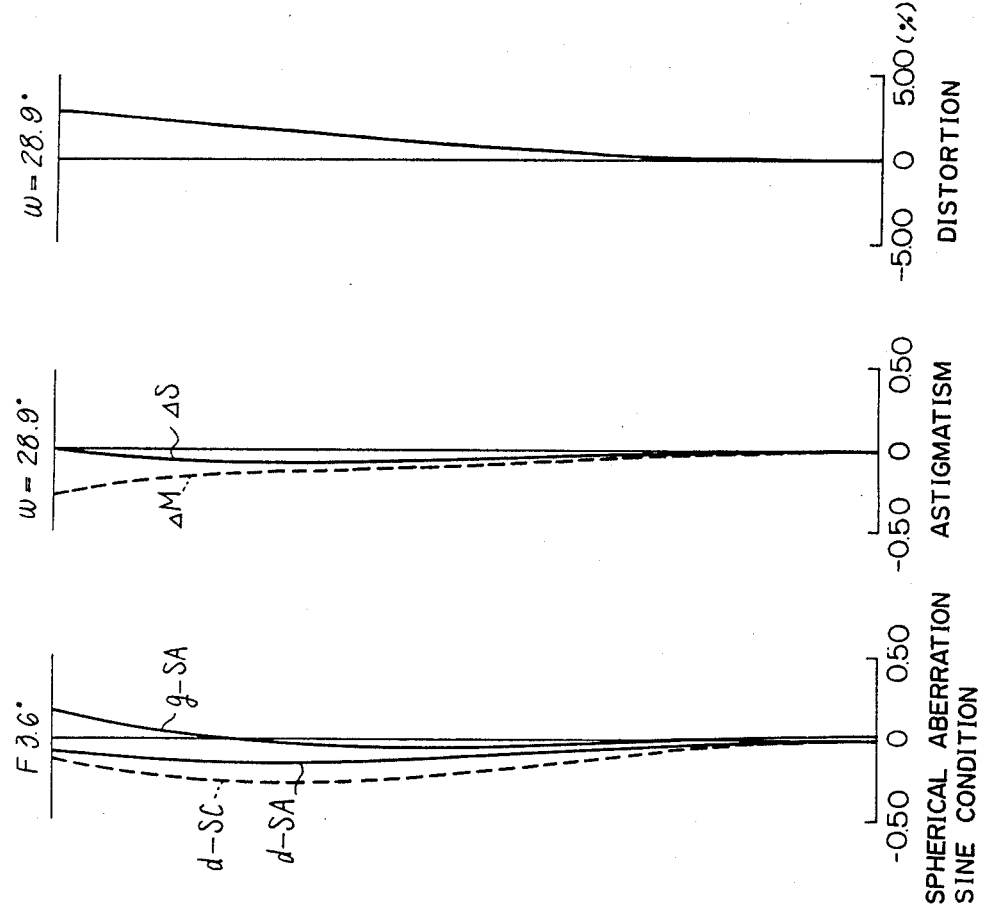
FIGS. 15(a) through 15(e) are diagrams showing aberrations of the zoom lens of EXAMPLE 7 and comparative EXAMPLE.
Figure 15B:
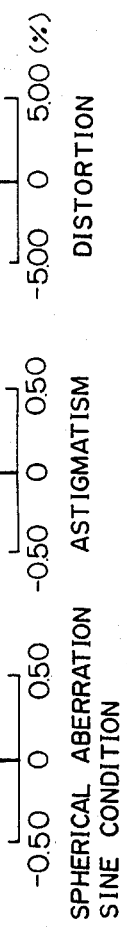
Figure 15C:
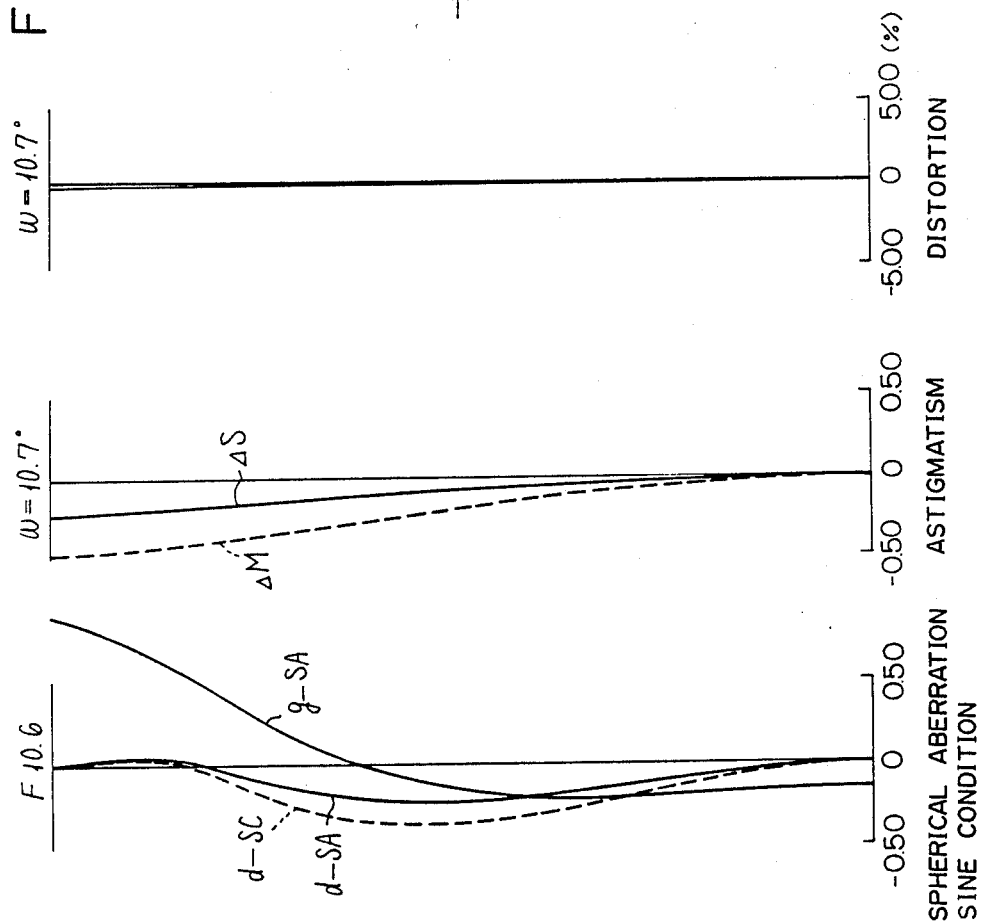
Figure 15:
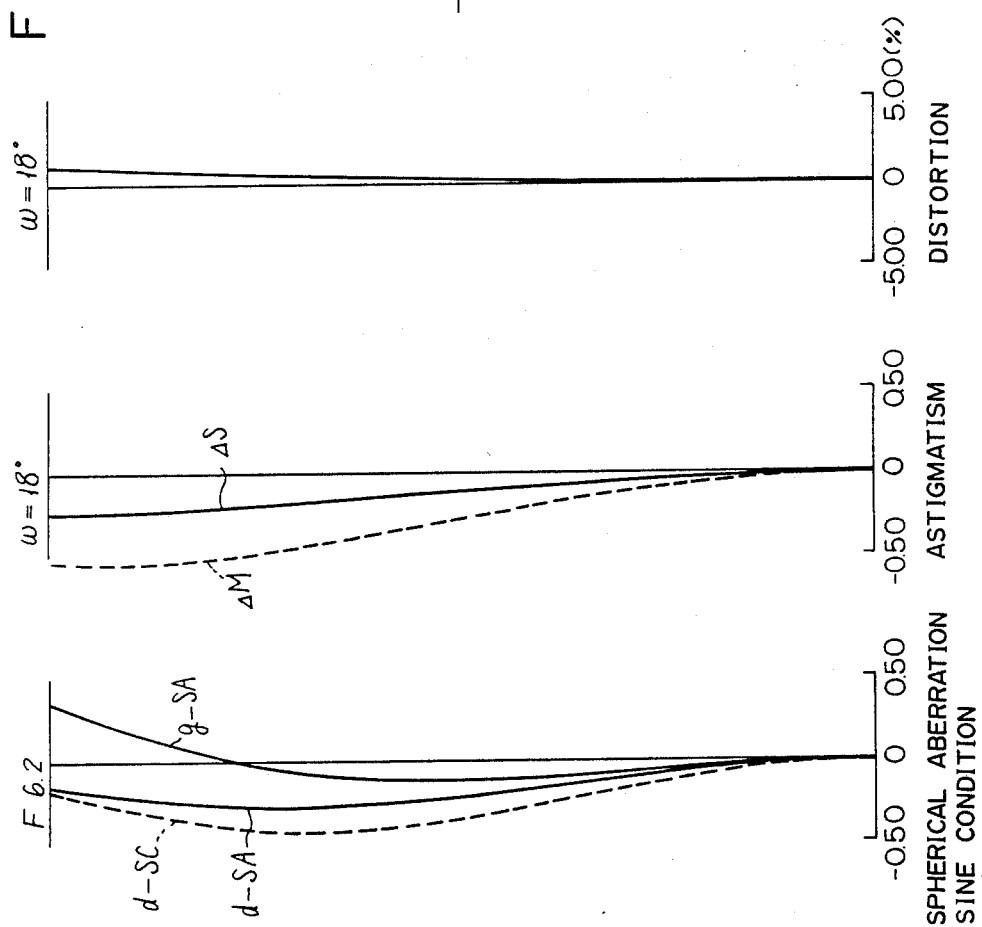
Figure 15E:
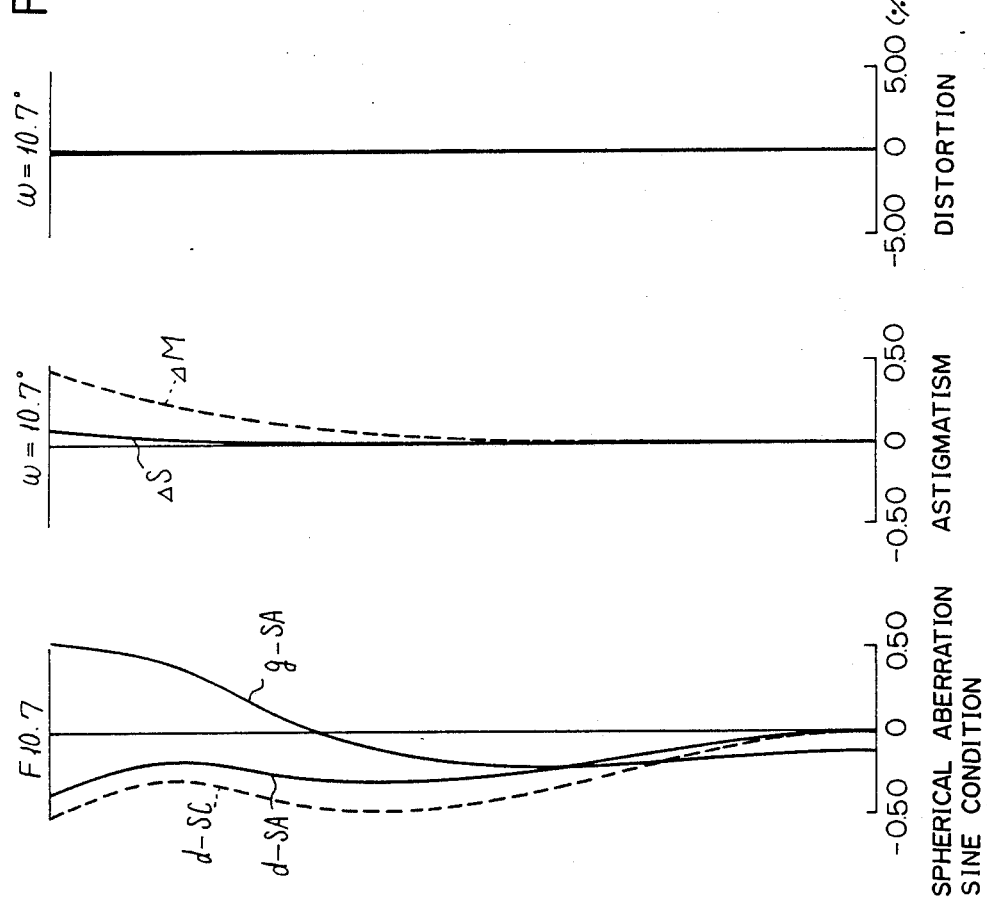

EXAMPLE 7 (see FIG. 14):

$f = 38 \sim 114$, $1:3.55 \sim 10.6$, Half angle of view: $28.9° \sim 10.7°$

| i | $r_i$ | $d_i$ | J | $n_j$ | $\nu_j$ |
|---|---|---|---|---|---|
| 1 | 33.015 | 3.52 | 1 | 1.80518 | 25.5 |
| 2 | 87.346 | 2.1 | | | |
| 3 | −23.343 | 1.24 | 2 | 1.7725 | 49.6 |
| 4 | −496.963 | Variable | | | |
| 5 | 25.041 | 2.4 | 3 | 1.58913 | 61.3 |
| 6* | −37.941 | 0.3 | | | |
| 7 | −28.361 | 0.9 | 4 | 1.834 | 37.3 |
| 8 | 30.569 | 0.3 | | | |
| 9 | 49.729 | 2.4 | 5 | 1.58913 | 61.3 |
| 10 | −22.931 | 0.2 | | | |
| 11 | 46.974 | 0.9 | 6 | 1.8061 | 33.3 |
| 12 | 19.133 | 2.4 | 7 | 1.6968 | 55.5 |
| 13* | −37.12 | Variable | | | |
| 14 | −121.322 | 3.4 | 8 | 1.5927 | 35.5 |
| 15 | −24.488 | 2.4 | | | |
| 16 | −29.39 | 1.1 | 9 | 1.7725 | 49.6 |
| 17 | 84.305 | 6 | | | |
| 18 | −15.366 | 1.5 | 10 | 1.8042 | 46.5 |
| 19 | 162.163 | 4.8 | 11 | 1.84666 | 23.8 |
| 20 | −43.675 | | | | |

When the distance between the front and rear groups is variable:

| f | 38 | 65.818 | 114 |
|---|---|---|---|
| $d_4$ | 3.838 | 3.987 | 3.416 |
| $d_{13}$ | 11.004 | 4.168 | 0.386 |

When the distance between the front and rear groups is invariable:

| f | 38 | 65.818 | 114 |
|---|---|---|---|
| $d_4$ | 3.838 | 3.838 | 3.838 |
| $d_{13}$ | 11.004 | 4.212 | 0.29 |

$r_6^*: A_4 = 4.11843 \cdot 10^{-6}, A_6 = 2.99534 \cdot 10^{-8}, A_8 = -4.31082 \cdot 10^{-10}$
$r_{13}^*: A_4 = 3.04853 \cdot 10^{-6}, A_6 = -1.30204 \cdot 10^{-7}, A_8 = -1.66599 \cdot 10^{-9}$

Figure 16:
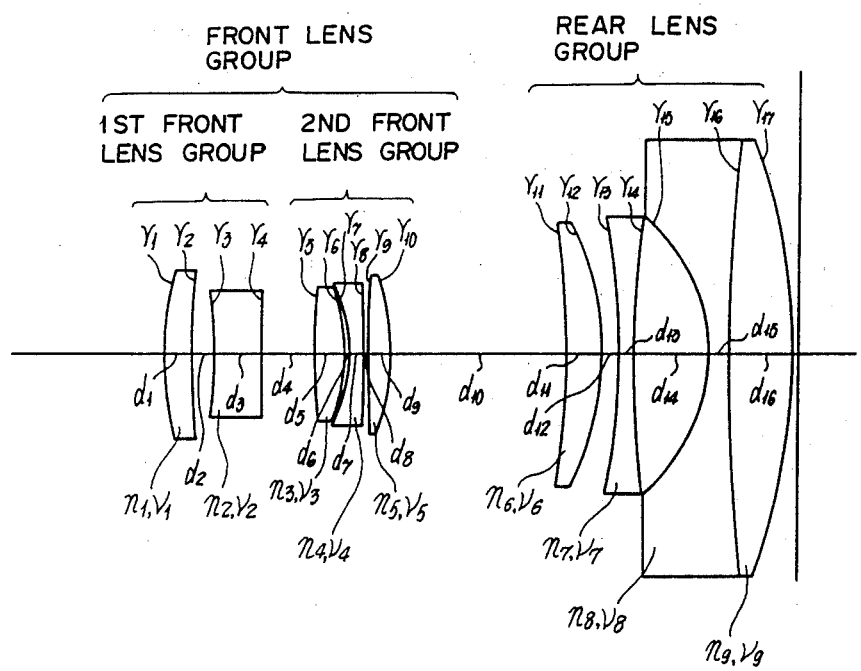
FIG. 16 is a schematic view of a zoom lens according to EXAMPLE 8.
Figure 17A:
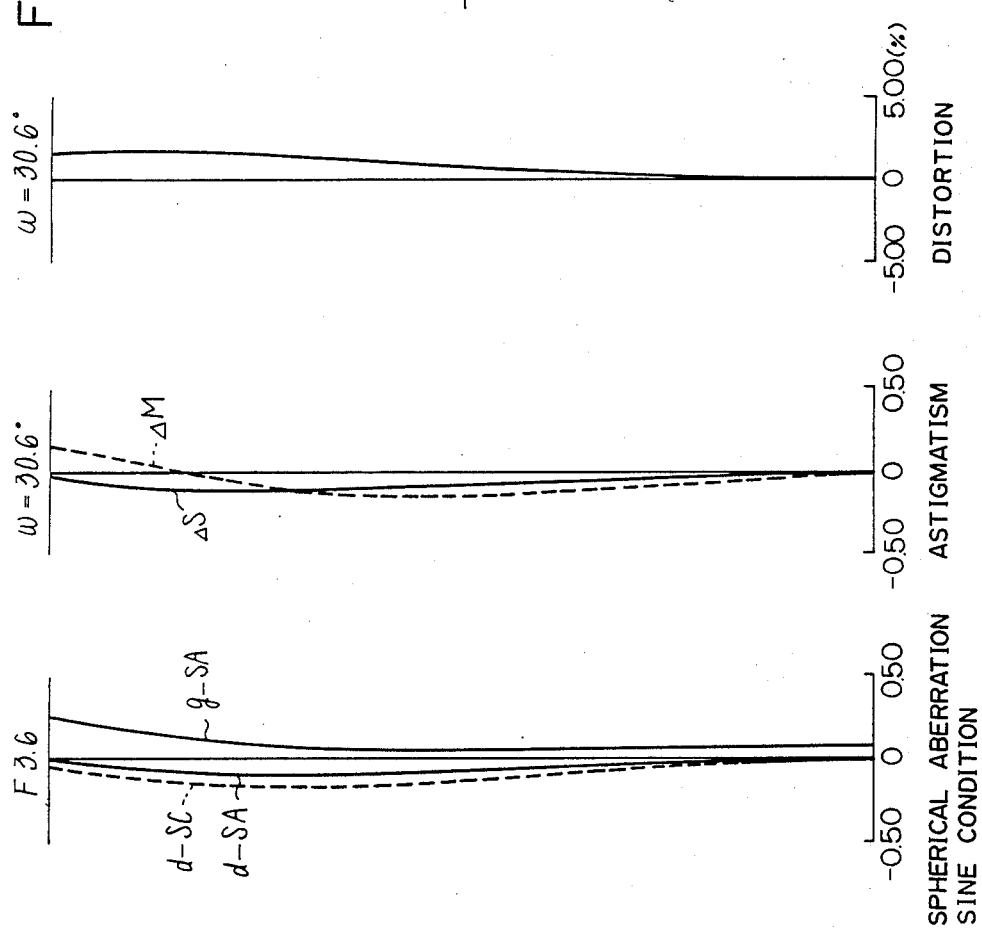
Figure 17B:
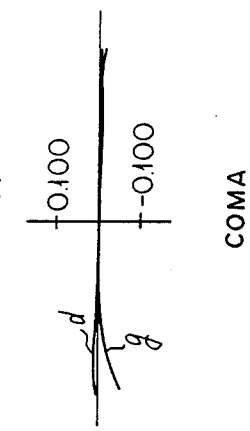
Figure 17B:
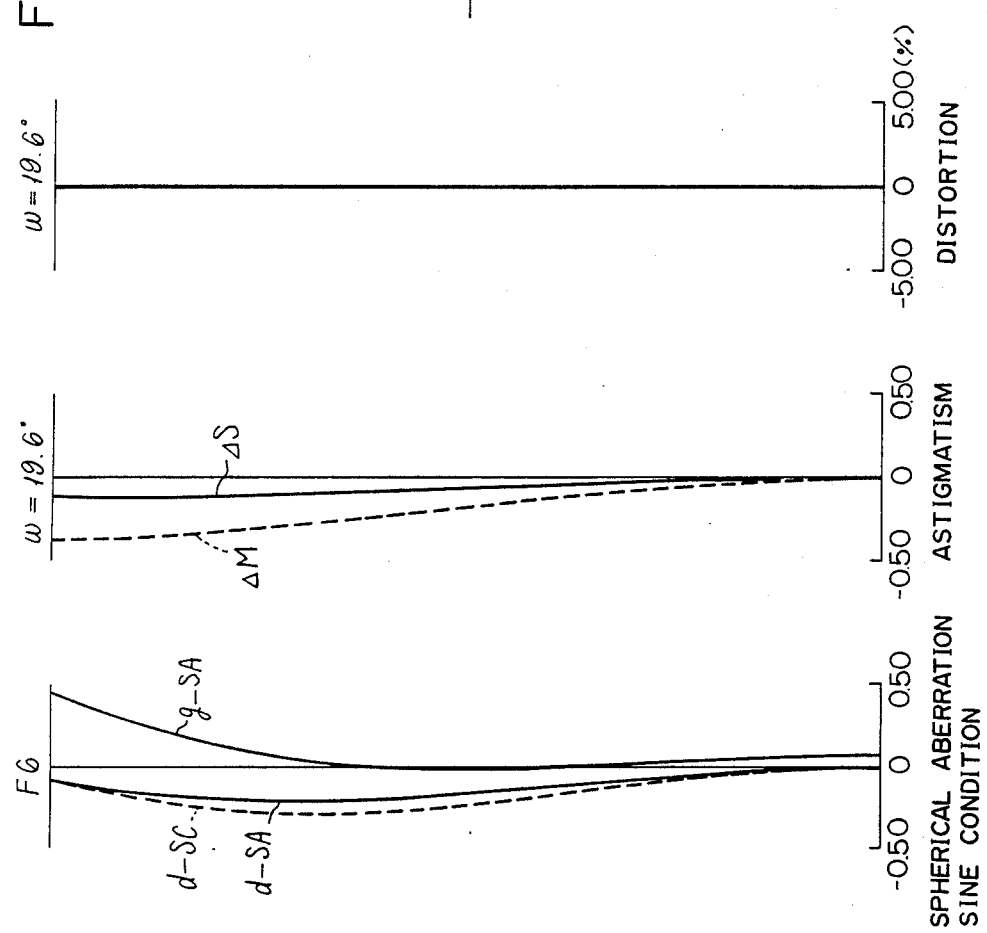
Figure 17C:
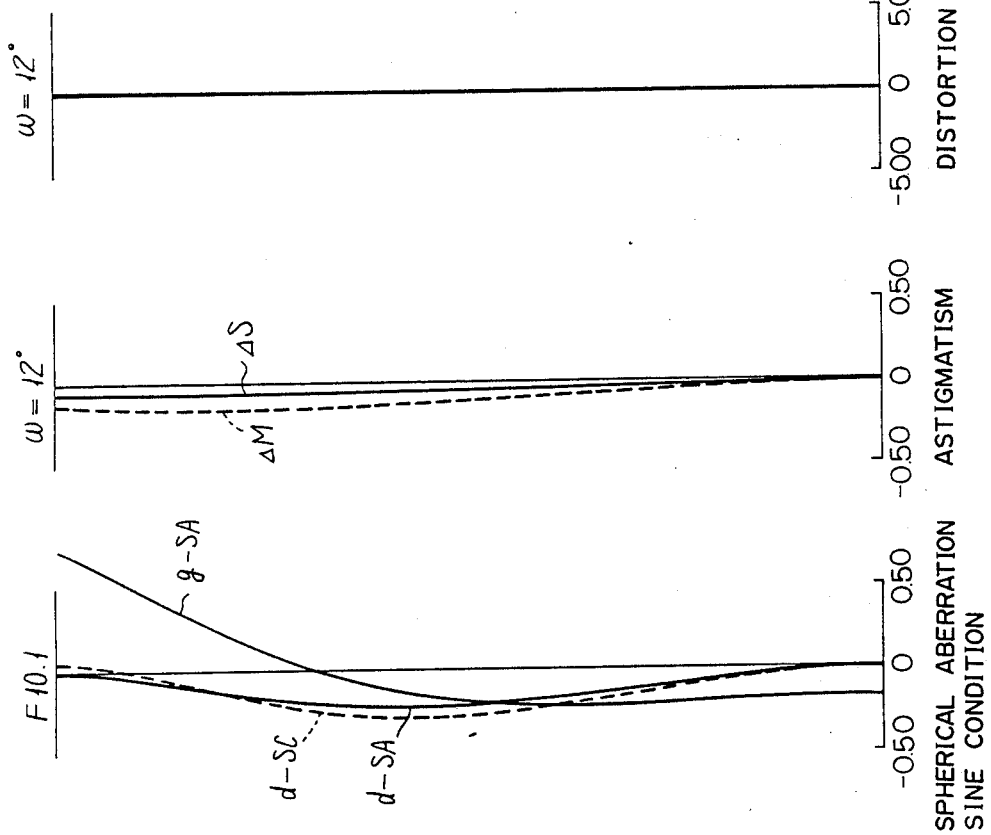

EXAMPLE 8 (see FIG. 16):

$f = 36 \sim 102$, $1:3.57 \sim 10.11$, Half angle of view: $30.6° \sim 12°$

| i | $r_i$ | $d_i$ | J | $n_j$ | $\nu_j$ |
|---|---|---|---|---|---|
| 1 | 28.444 | 2.32 | 1 | 1.80518 | 25.5 |
| 2 | 86.261 | 1.81 | | | |
| 3* | −34.563 | 3.93 | 2 | 1.835 | 43 |
| 4 | 186.174 | Variable | | | |
| 5* | 50.424 | 2.5 | 3 | 1.51823 | 59 |
| 6 | −15.427 | 0.5 | | | |
| 7 | −13.214 | 1.18 | 4 | 1.80518 | 25.5 |
| 8 | −209.816 | 0.42 | | | |
| 9 | 96.471 | 2 | 5 | 1.835 | 43 |
| 10* | −18.001 | Variable | | | |
| 11 | −75.796 | 3 | 6 | 1.5927 | 35.5 |
| 12 | −24.655 | 1.43 | | | |
| 13 | −56.269 | 1.15 | 7 | 1.7725 | 49.6 |
| 14 | 101.682 | 6.3 | | | |
| 15 | −14.897 | 1.6 | 8 | 1.7725 | 49.6 |
| 16 | 158.079 | 5.5 | 9 | 1.84666 | 23.8 |
| 17 | −51.777 | | | | |

When the distance between the front and rear groups is variable:

| f | 36 | 60.597 | 102 |
|---|---|---|---|
| $d_4$ | 4.409 | 4.589 | 4.287 |
| $d_{10}$ | 14.516 | 5.648 | 0.439 |

When the distance between the front and rear groups is invariable:

| f | 36 | 60.597 | 102 |
|---|---|---|---|
| $d_4$ | 4.409 | 4.409 | 4.409 |
| $d_{10}$ | 14.516 | 5.677 | 0.426 |

$r_3^*: A_4 = 6.58663 \cdot 10^{-7}, A_6 = -1.82071 \cdot 10^{-9}, A_8 = -1.59764 \cdot 10^{-9}$
$r_5^*: A_4 = -3.55818 \cdot 10^{-6}, A_6 = 9.41893 \cdot 10^{-8}, A_8 = 5.63982 \cdot 10^{-9}$
$r_{10}^*: A_4 = 1.7705 \cdot 10^{-5}, A_6 = 1.72229 \cdot 10^{-7}, A_8 = -3.04356 \cdot 10^{-10}$ The relationship between the parameters in the conditions (i) through (v) and above EXAMPLES is given in the following Table 2:

TABLE 2

| EXAMPLES | 5 | 6 | 7 | 8 |
|---|---|---|---|---|
| $f_1/f_W$ | 0.753~0.758 | 0.716~0.72 | 0.712~0.72 | 0.795~0.797 |
| $|f_2|/f_T$ | 0.23 | 0.215 | 0.197 | 0.268 |
| $\nu_{1ap}$ | 25.5 | 25.5 | 25.5 | 25.5 |
| $\nu_{1an}$ | 43 | 49.6 | 49.6 | 43 |
| $\nu_{1bp}$ | 60.7 | 59.2 | 59.3 | 51 |
| $\nu_{1bn}$ | 34.8 | 32.2 | 35.3 | 25.5 |
| $\nu_{23}$ | 49.6 | 49.6 | 46.5 | 49.6 |
| $\nu_{24}$ | 23.8 | 25.5 | 23.8 | 23.8 |
| $R_{2r}/f_W$ | −1.098 | −1.051 | −1.149 | −1.438 |

The lenses of the above EXAMPLES shown in FIGS. 10, 12, 14, 16 are of an arrangement at the wide angle end.

FIGS. 11(a) through 11(e) show aberrations of the zoom lens of EXAMPLE 5, FIGS. 13(a) through 13(e) aberrations of the zoom lens of EXAMPLE 6, FIGS. 15(a) through 15(e) aberrations of the zoom lens of EXAMPLE 7, and FIGS. 17(a) through 17(e) aberrations of the zoom lens of EXAMPLE 8. FIGS. 11(a), 13(a), 15(a), 17(a) show aberrations at the wide angle end, FIGS. 11(b), 13(b), 15(b), 17(b) aberrations at the intermediate zoom range position, and FIGS. 11(c), 13(c), 15(c), 17(c) aberrations at the telephoto end. FIGS. 11(d), 13(d), 15(d), 17(d) illustrate, as comparative EXAMPLE, aberrations at the intermediate zoom range position when the distance between the first and second front lens groups remain unchanged, and FIGS. 11(e), 13(e), 15(e), 17(e) show, as comparative EXAMPLE, aberrations at the telephoto end when the distance between the first and second lens groups remains unchanged.

Denoted at d-SA is the spherical aberration for d-line, g-SA the spherical aberration for g-line, d-SC the sine condition for d-line, ΔS the sagittal image plane, ΔM the meridional image plane, d the d-line, g the g-line, and ω the half angle of view.

In EXAMPLES 5 through 7, the central position of the best image plane and the peripheral position of the best image plane substantially coincide with each other at the wide angle end. Upon zooming while keeping the distance between the first and second front lens groups unchanged, the peripheral portion of the best image plane is spaced in a direction toward the lens with respect to the central position of the best image plane near the intermediate zoom range position because insufficiently corrected astigmatism generated in the rear lens group becomes larger. Near the telephoto end, conversely, since insufficiently corrected astigmatism produced in the rear lens group becomes smaller and because of coma, the peripheral position of the best image plane is spaced in a direction away from the lens with respect to the central position of the best image plane. In order to correct this in EXAMPLES 5, 6, 7, the distance between the first and second front lens group is increased and excessively corrected low-order astigmatism produced primarily in the front lens group is increased near the intermediate zoom lens position, and the distance between the first and second front lens groups is reduced and insufficiently corrected spherical aberration and overly corrected astigmatism, which are produced mainly in the front lens group, are reduced near the telephoto end.

In EXAMPLE 8, the central position of the best image plane and the peripheral position of the best image plane substantially coincide with each other at the wide angle end. Upon zooming while keeping the distance between the first and second front lens groups unchanged, the peripheral position of the best image plane is spaced in a direction toward the lens with respect to the central position of the best image plane near the intermediate zoom range position. Near the telephoto end, the peripheral position of the best image plane is spaced in a direction away from the lens with respect to the central position of the best image plane.

The reasons for the above phenomena in EXAMPLE 8 are as follows: To keep the central position of the best image plane and the peripheral position of the best image plane in coincidence with each other at the wide angle end, the low-order astigmatism is insufficiently corrected so as to be balanced by excessively corrected high-order astigmatism. Near the intermediate zoom range position, however, the excessively corrected high-order astigmatism has no effect, but only the insufficiently corrected low-order astigmatism remains, so that the peripheral position of the best image plane is spaced toward the lens with respect to the central position of the best image plane. In the vicinity of the telephoto end, because insufficiently corrected astigmatism produced in the rear lens group is reduced, and due to coma, the peripheral position of the best image plane is spaced away from the lens with respect to the central position of the best image plane.

In order to correct this in EXAMPLE 8, the distance between the first and second front lens group is increased and excessively corrected astigmatism produced primarily in the front lens group is increased near the intermediate zoom lens position, and the distance between the first and second front lens groups is reduced and insufficiently corrected spherical aberration and overly corrected astigmatism, which are produced mainly in the front lens group, are reduced near the telephoto end.

In the above description, the excessive correction means a positive direction in actual aberration, and the insufficient correction means a negative direction in actual aberration.

Although certain preferred embodiments have been shown and described, it should be understood that many changes and modifications may be made therein without departing from the scope of the appended claims.

What is claimed is:

1. A zoom lens comprising a front lens group having a positive focal length and a rear lens group having a negative focal length, with the distance between the front and rear lens groups being variable for varying the magnification of the zoom lens, said front lens group comprising a first front lens group having a negative focal length and a second front lens group having a positive focal length, the first and second front lens groups being successively arranged in the order specified from an object side, said first front lens group comprising, in the order named from the object side, at least a positive lens and a negative lens, said second front lens group comprising at least one negative lens and at least two positive lenses, said rear lens group comprising, in the order specified from the object side, a positive lens, a negative lens, a negative lens, and a positive lens, said zoom lens meeting the following conditions:

$$0.6 < f_1/f_W < 0.9 \tag{i}$$

$$0.15 < |f_2|/f_T < 0.3 \tag{ii}$$

$$\nu_{1ap} < \nu_{1an} \tag{III}$$

$$\nu_{1bp} > \nu_{1bn} \tag{IV}$$

$$\nu_{23} > \nu_{24} \tag{V}$$

where $f_1$ is the focal length of the front lens group, $f_2$ is the focal length of the rear lens group, $f_W$ is the focal length of the zoom lens at the wide angle end of the zoom lens stroke, $f_T$ is the focal length of the zoom lens at the telephoto end of the zoom lens stroke, $\nu_{1ap}$ is the average of Abbe numbers of the positive lens in the first front lens group, $\nu_{1an}$ is the average of Abbe numbers of the negative lens in the first front lens group, $\nu_{1bp}$ is the average of Abbe numbers of the positive lenses in the second front lens group, $\nu_{1bn}$ is the average of Abbe numbers of the negative lens in the second front lens group, $\nu_{23}$ is the Abbe number of the third lens in the rear lens group, and $\nu_{24}$ is the Abbe number of the fourth lens in the rear lens groups.

2. A zoom lens comprising a front lens group having a positive focal length and a rear lens group having a negative focal length, with the distance between the front and rear lens groups being variable for varying the magnification of the zoom lens, said front lens group comprising a first front lens group having a negative focal length and a second front lens group having a positive focal length, the first and second front lens groups being successively arranged in the order specified from an object side, said first front lens group comprising, in the order named from the object side, at least a positive lens and a negative lens, said second front lens group comprising at least one negative lens and at least two positive lenses, said rear lens group comprising, in the order specified from the object side, a positive lens, a negative lens, a negative lens, and a positive lens, said zoom lens meeting the following conditions:

$$0.6 < f_1/f_W < 0.9 \tag{I}$$

$$0.15 < |f_2|/f_T < 0.3 \tag{II}$$

$$\nu_{1ap} < \nu_{1an} \tag{III}$$

$$\nu_{1bp} > \nu_{1bn} \tag{IV}$$

$$\nu_{23} > \nu_{24} \tag{V}$$

where $f_1$ is the focal length of the front lens group, $f_2$ is the focal length of the rear lens group, $f_W$ is the focal length of the zoom lens at the wide angle end of the zoom lens stroke, $f_T$ is the focal length of the zoom lens at the telephoto end of the zoom lens stroke, $\nu_{1ap}$ is the average of Abbe numbers of the positive lens in the front front lens group, $\nu_{1an}$ is the average of Abbe numbers of the negative lens in the first front lens group, $\nu_{1bp}$ is the average of Abbe numbers of the positive lenses in the second front lens group, $\nu_{1bn}$ is the average of Abbe numbers of the negative lens in the second front lens group, $\nu_{23}$ is the Abbe number of the third lens in the rear lens group, and $\nu_{24}$ is the Abbe number of the fourth lens in the rear lens group, the distance between said first and second front lens groups being variable during zooming movement.

* * * * *